(12) United States Patent
Rajiyah et al.

(10) Patent No.: US 11,483,316 B1
(45) Date of Patent: Oct. 25, 2022

(54) SYSTEM AND METHOD FOR ACCESS USING A CIRCLE OF TRUST

(71) Applicant: Workday, Inc., Pleasanton, CA (US)

(72) Inventors: Krishnan Rajiyah, Oakland, CA (US); Marius Maaland, Oakland, CA (US); Kamalanathan Thandapani, Livermore, CA (US); Lionello G. Lunesu, Peng Chau (HK); Prakash Sundaresan, Redmond, WA (US); Aneesh Sandeep Verenkar, San Jose, CA (US); Amit Jasuja, Pleasanton, CA (US); Keith Kowal, Pleasanton, CA (US)

(73) Assignee: Workday, Inc., Pleasanton, CA (US)

( * ) Notice: Subject to any disclaimer, the term of this patent is extended or adjusted under 35 U.S.C. 154(b) by 255 days.

(21) Appl. No.: 16/918,968

(22) Filed: Jul. 1, 2020

Related U.S. Application Data

(60) Provisional application No. 62/872,946, filed on Jul. 11, 2019.

(51) Int. Cl.
*H04L 29/06* (2006.01)
*H04L 9/40* (2022.01)
*G06F 16/23* (2019.01)

(52) U.S. Cl.
CPC ........ *H04L 63/102* (2013.01); *G06F 16/2379* (2019.01); *H04L 63/0815* (2013.01)

(58) Field of Classification Search
CPC ... H04L 63/102; H04L 63/0815; H04L 63/10; H04L 63/101; H04L 63/104; G06F 16/2379; G06F 21/44; G06F 21/445; G06F 21/62; G06F 21/629

See application file for complete search history.

(56) References Cited

U.S. PATENT DOCUMENTS

| | | | | |
|---|---|---|---|---|
| 9,043,886 | B2* | 5/2015 | Srinivasan | .......... H04L 63/0815 726/9 |
| 9,513,979 | B2* | 12/2016 | Kraljic | .................... G06Q 10/06 |
| 9,858,781 | B1* | 1/2018 | Campero | .............. H04L 9/3242 |
| 10,410,232 | B1 | 9/2019 | Lueken | |
| 10,460,313 | B1 | 10/2019 | Clark | |
| 10,997,590 | B2 | 5/2021 | Deliwala | |
| 2008/0282354 | A1* | 11/2008 | Wobber | .............. G06F 21/6218 726/26 |
| 2013/0159186 | A1 | 6/2013 | Brudnicki | |
| 2013/0191227 | A1 | 7/2013 | Pasa | |

(Continued)

*Primary Examiner* — Malcolm Cribbs
(74) *Attorney, Agent, or Firm* — Van Pelt, Yi & James LLP

(57) ABSTRACT

A processor-implemented method includes (i) automatically defining a first Circle of Trust (CoT) by a first CoT administrator, in a CoT database, (ii) automatically receiving, at a digital identity management (DIM) server, a first digital identity wallet (DIW) application request from a first DIW application provider server, (iii) automatically adding the first DIW application to the CoT database if the first CoT administrator approves the first DIW application request, (iv) automatically receiving, at the DIM server, a relying party application request from the at least one relying party application associated with the relying party and (v) automatically adding, the at least one relying party application to the CoT database, if the first CoT administrator approves the relying party application request.

30 Claims, 17 Drawing Sheets

(56) References Cited

U.S. PATENT DOCUMENTS

| | | |
|---|---|---|
| 2014/0068779 A1* | 3/2014 | Tan ................ G06F 21/606 |
| | | 726/26 |
| 2016/0036790 A1* | 2/2016 | Shastry ............ G06Q 20/3821 |
| | | 713/168 |
| 2016/0180333 A1* | 6/2016 | Leyva ................ G06Q 20/363 |
| | | 705/41 |
| 2017/0032370 A1 | 2/2017 | Beltramino |
| 2017/0186114 A1 | 6/2017 | Bongiovi |
| 2017/0235943 A1* | 8/2017 | Li ........................ G06F 9/44 |
| | | 726/30 |
| 2018/0004972 A1 | 1/2018 | Ruggiero |
| 2018/0068314 A1 | 3/2018 | Robeen |
| 2018/0139286 A1* | 5/2018 | Jia ...................... H04L 63/101 |
| 2019/0138698 A1* | 5/2019 | Qiu ..................... G06F 21/121 |
| 2019/0197530 A1* | 6/2019 | Gosalia ............ G06Q 20/3674 |
| 2019/0199720 A1* | 6/2019 | Palli .................... H04W 12/08 |
| 2019/0295054 A1 | 9/2019 | Purves |
| 2020/0019964 A1 | 1/2020 | Miller |
| 2020/0211124 A1 | 7/2020 | Bhagat |
| 2020/0311712 A1 | 10/2020 | Sharma |
| 2021/0357518 A1* | 11/2021 | Poe ....................... G06F 21/12 |
| 2022/0271958 A1 | 8/2022 | Bassili |

* cited by examiner

SYSTEM AND METHOD FOR ACCESS USING A CIRCLE OF TRUST

CROSS REFERENCE TO OTHER APPLICATIONS

This application claims priority to U.S. Provisional Patent Application No. 62/872,946 entitled SYSTEM AND METHOD FOR AUTOMATICALLY DEFINING A CIRCLE OF TRUST AT A DIGITAL IDENTITY MANAGEMENT SERVER AND AUTOMATICALLY PERMITTING AT LEAST ONE RELYING PARTY APPLICATION TO ACCESS AT LEAST ONE DIGITAL IDENTITY WALLET APPLICATION ASSOCIATED WITH THE CIRCLE OF TRUST filed Jul. 11, 2019 which is incorporated herein by reference for all purposes.

BACKGROUND OF THE INVENTION

Applications require user authentication to enable users to access them, which is typically done using credentials—for example, a username and password. Since it is cumbersome for users to create credentials for each application, many applications rely on user credentials from a third-party application for authentication, in order to make it easier for the user to avoid having to create a new set of credentials. These applications are called relying party applications. These user credentials may be stored as cookies in a browser and can be retrieved and used by each relying party application to automatically login. However, there is a risk these cookies can be accessed by malware in order to access a relying party application and perform unauthorized transactions.

One way to reduce this risk to use a separate application for authentication, such as a Digital Identity Wallet application or an authentication or authorizing application—for example, Facebook. When the user initiates an authentication or authorization request from a relying party application, it may be received in the authentication or authorization application that is used to authenticate the user, typically using a notification system. A further risk is unauthorized (e.g., "spam") requests of the digital identity wallet application by nefarious relying party applications. A nefarious relying party application could pose as a known party—for example, a commonly used bank or human resources system, seeking to acquire the credentials of unwitting users. This creates a problem of opening users up to a new category of attack, putting some of their most sensitive data at risk.

BRIEF DESCRIPTION OF THE DRAWINGS

Various embodiments of the invention are disclosed in the following detailed description and the accompanying drawings.

DETAILED DESCRIPTION

Figure 1A:
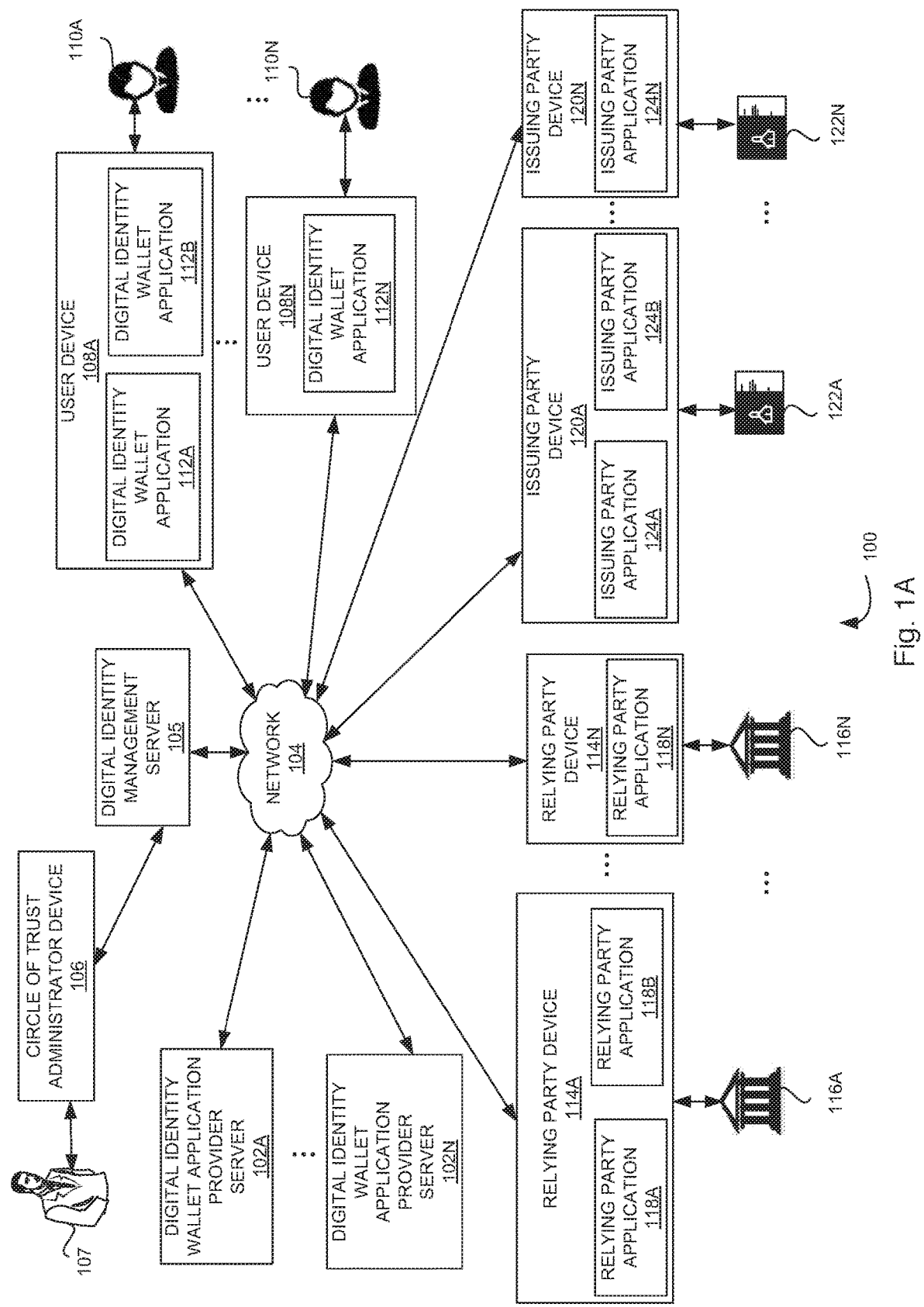
FIG. 1A is a block diagram that illustrates one or more relying party devices associated with one or more relying parties and one or more issuing party devices associated with one or more issuing parties communicating with one or more user devices associated with one or more users through a network according to some embodiments herein.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system and method for access using a circle of trust is disclosed. The system comprises a processor. The processor-implemented method automatically adds, based on an approval indicator received from a first circle of trust (CoT) administrator of a first CoT, at least one digital identity wallet (DIW) application and at least one relying party application associated with a relying party to a CoT database that is communicatively coupled to a digital identity management server. The method comprises: automatically defining the first CoT by the first CoT administrator, in the CoT database; automatically receiving, at the digital identity management server, a first DIW application request from a first DIW application provider server associated with a first DIW application provider for a first DIW application to be associated with the first CoT; automatically adding the first DIW application to the CoT database if the first CoT administrator approves the first DIW application request; automatically receiving, at the digital identity management server, a relying party application request from the at least one relying party application associated with the relying party for the at least one relying party application to be associated with the first CoT; and automatically adding, the at least one relying party application to the CoT database, if the first CoT administrator approves the relying party application request, wherein the first CoT is a named entity that defines an association between the at least one DIW application and the at least one relying party application, wherein the at least one relying party application is permitted to access the at least one DIW application.

Embodiments of this disclosure generally relate to automatically defining a circle of trust (CoT) by a circle of trust (CoT) administrator at a digital identity management server, and more particularly, to a system and method for automatically adding, based on an approval indicator received from the circle of trust (CoT) administrator of the CoT, at least one digital identity wallet (DIW) application and at least one relying party application associated with a relying party to a CoT database that is communicatively coupled to the digital identity management server.

In some embodiments, a digital identity wallet (DIW) application of a user may be used to authenticate the user to a relying party application of a relying party (e.g., a doctor's office or a hospital). The relying part (e.g., the doctor's office, may have many clients—for example, patients). Each client may have one or more health insurance policies/plans that are associated with one or more digital identity wallet providers. Each health insurance company may provide their own DIW application to the one or more clients. If the relying party (e.g., the doctor's office) wants to access the DIW application, the relying party has to interface with each client's DIW application and possibly sign one or more legal agreements with each wallet provider associated with each of the multiple DIW applications associated with their clientele. If each client has one or more DIW applications which are obtained from different health insurance companies, or if the relying party wants to access different DIW applications of different clients, the relying party (e.g., the doctor's office) has to interface with each client's DIW application and possibly sign one or more legal agreements with all the health insurance providers of the DIW applications to access each DIW application of a single client or different DIW applications of the different clients.

In some embodiments, the DIW uses an identity claim issued by an issuing party to provide authenticated information of a user to a relying party.

In some embodiments, the issuing party may be a credit rating agency that issues identity claims for a user of the DIW application, which may include one or more attributes such as a credit score. If the issuing party wants to access different DIWs of different clients, the issuing party (e.g., the credit rating agency) has to interface with each client's DIW application and possibly sign legal agreements with all the wallet providers of the DIW applications to access each DIW application of the single client or different DIW applications of the different clients.

If the client/user has more than one DIW application, or different clients/users have different DIW applications, it rapidly becomes a significant burden for the RPs and the IPs to target a specific DIW of the client/user. Accordingly, there remains a need for improving on existing approaches for providing benefits to the RPs and the IPs to access different DIW applications of the clients/users without having to interface with each client's DIW application and possibly sign legal agreements with each DIW application provider.

In some embodiments, a processor-implemented method includes automatically adding, based on an approval indicator received from a first circle of trust (CoT) administrator of a first CoT, at least one digital identity wallet (DIW) application and at least one relying party application associated with a relying party to a CoT database that is communicatively coupled to a digital identity management server. The method includes (i) automatically defining the first CoT by the first CoT administrator, in the CoT database; (ii) automatically receiving, at the digital identity management server, a first DIW application request from a first DIW application provider server associated with a first DIW application provider for a first DIW application to be associated with the first CoT; (iii) automatically adding the first DIW application to the CoT database if the first CoT administrator approves the first DIW application request; (iv) automatically receiving, at the digital identity management server, a relying party application request from the at least one relying party application associated with the relying party for the at least one relying party application to be associated with the first CoT; and (v) automatically adding, the at least one relying party application to the CoT database, if the first CoT administrator approves the relying party application request. The first CoT is a named entity that defines an association between the at least one DIW application and the at least one relying party application. The at least one relying party application is permitted to access the at least one DIW application.

In some embodiments, the method further includes the step of automatically permitting, at the digital identity management server, the at least one relying party application to access the first DIW application that is associated with the first CoT. In some embodiments, automatically permitting the at least one relying party application to access the first DIW application includes permitting the at least one relying party application to authenticate or authorize a user associated with the first DIW application to the at least relying party application.

In some embodiments, the method further includes the step of automatically denying, at the digital identity management server, access to the at least one DIW application by a relying party application that is not associated with the first CoT.

In some embodiments, the method further includes the step of automatically sending an approval notification to the first DIW application provider server associated with the first DIW application provider if the first CoT administrator approves the first DIW application request from the first DIW application provider server associated with the first DIW application provider.

In some embodiments, the method further includes the step of automatically sending a denial notification to the first DIW application provider server associated with the first DIW application provider if the first CoT administrator denies the first DIW application request from the first DIW application provider server associated with the first DIW application provider.

In some embodiments, the method further includes the step of accessing, the first DIW application in the first CoT, with the at least one relying party application in the first CoT at a relying party device associated with the relying party by specifying a first wallet identifier for the first DIW application and a user identifier of the user.

In some embodiments, the method further includes the steps of (i) automatically receiving, at the digital identity management server, a second DIW application request from a second DIW application provider server associated with a second DIW application provider of a second DIW application to be associated with the first CoT and (ii) automatically adding the second DIW application to the first CoT database if the first CoT administrator approves the second DIW application request.

In some embodiments, the method further includes the steps of (i) automatically receiving, at the digital identity management server, an issuing party application request from at least one issuing party application associated with an issuing party for the at least one issuing party application to be associated with first CoT; (ii) automatically adding the at least one issuing party application to the first CoT database if the first CoT administrator approves the issuing party application request; and (iii) automatically permitting, at the digital identity management server, the at least one issuing party application to access the first DIW application and the second DIW application.

In some embodiments, automatically permitting the at least one issuing party application to access the first DIW application and the second DIW application includes permitting the at least one issuing party application to issue at least one identity claim to the user of the first DIW application and at least one user of the second DIW application.

In some embodiments, the method further includes the step of automatically denying, at the digital identity management server, access to the at least one digital identity wallet application by an issuing party application that is not associated with the first CoT.

In some embodiments, the method further includes the step of accessing, the user of the first DIW application in the first CoT, with the at least one issuing party application in the first CoT at an issuing party device associated with the issuing party by specifying the first wallet identifier for the first DIW application and the user identifier of the user.

In some embodiments, the method further includes the step of accessing, the user of the second DIW application in the first CoT, with the at least one issuing party application in the first CoT at the issuing party device associated with the issuing party by specifying a second wallet identifier for the second DIW application and the user identifier of the at least one user.

In some embodiments, the first DIW application is associated with a plurality of circles of trust (CoTs). In some embodiments, the at least one relying party application is associated with only one CoT.

In some embodiments, each relying party application associated with the first CoT cannot access other relying party applications and other issuing party applications that are associated with the first CoT.

In some embodiments, each DIW application associated with the first CoT cannot access other DIW applications that are associated with the first CoT.

In some embodiments, each issuing party application associated with the first CoT cannot access other issuing party applications and other relying party applications that are associated with the first CoT.

In some embodiments, the method further includes the steps of (i) automatically defining, at the digital identity management server, a second CoT by a second CoT administrator and the second CoT includes a second set of DIW applications; (ii) automatically receiving, at the digital identity management server, a second relying party application request from the at least one relying party application associated with the relying party to be associated with the second CoT; (iii) automatically adding the at least one relying party application to the second CoT if the second CoT administrator approves the second relying party application request from the at least one relying party application; (iv) automatically disassociating, at the digital identity management server, the at least one relying party application associated with the relying party from the first CoT; (v) automatically permitting, at the digital identity management server, the at least one relying party application to access the second set of DIW applications associated with the second CoT; and (vi) automatically denying, at the digital identity management server, the at least one relying party application from accessing the first set of DIW applications that is associated with the first CoT.

In another aspect, a processor-implemented method for automatically permitting or denying authentication or authorization of a user to a relying party application associated with a relying party using a DIW application based on a CoT that is associated with the DIW application and the relying party application is provided. The method includes (i) receiving, at a digital identity management server, a request from the relying party application to authenticate or authorize the user to the relying party application using the DIW application; (ii) performing, at the digital identity management server, a relying party lookup operation on a relying party application mapping that is stored in a CoT database that is communicatively coupled to the digital identity management server to identify an associated CoT that the relying party application is associated with; (iii) performing, at the digital identity management server, a DIW application lookup operation on a DIW application mapping that is stored in the CoT database to identify if the DIW application is associated with the associated CoT; and (iv) automatically denying, at the digital identity management server, access to the relying party application using the DIW application if the DIW application is not associated with the associated CoT. The CoT is a named entity that defines an association between the DIW application and the relying party application. The relying party application is automatically permitted to access the DIW application associated with the CoT.

In some embodiments, automatically denying the access to the relying party application using the DIW application includes denying access to the relying party application to authenticate or authorize the user of the DIW application to the relying party application using the DIW application.

In some embodiments, the method further includes the step of automatically permitting the relying party application to access the DIW application if the DIW application is associated with the associated CoT. In some embodiments, automatically permitting the relying party application to access the DIW application includes permitting the relying party application to authenticate or authorize the user of the DIW application to the relying party application using the DIW application.

In some embodiments, the relying party application mapping is a mapping that specifies which CoT each relying party application is associated with.

In some embodiments, the DIW application maps at least one CoT to at least one DIW application.

In some embodiments, the DIW application is associated with a CoT if a CoT administrator approves a DIW application request from a DIW application provider to be associated with the CoT.

In some embodiments, the relying party application is associated to the CoT if the CoT administrator approves a relying party application request from the relying party application associated with a relying party to be associated with the CoT.

In some embodiments, the DIW application is associated with a plurality of CoTs. In some embodiments, the relying party application is associated with only one CoT.

In yet another aspect, a processor-implemented method for automatically permitting or denying an issuing party application associated with an issuing party to access a DIW application to issue at least one identity claim to a user of the DIW application based on a CoT that is associated with the DIW application and the issuing party application is provided. The method includes (i) generating, at the issuing party application, the at least one identity claim for the user of the DIW application; (ii) receiving, at a digital identity management server, the at least one identity claim from the issuing party application; (iii) performing, at the digital identity management server, an issuing party lookup operation on an issuing party application mapping that is stored in a CoT database that is communicatively coupled to the digital identity management server to identify an associated CoT that the issuing party application is associated with; (iv) performing, at the digital identity management server, a DIW application lookup operation on a DIW application mapping that is stored in the CoT database to identify if the DIW application is associated with the associated CoT; and (v) automatically denying, at the digital identity management server, access to the issuing party application using the DIW application if the DIW application is not associated with the associated CoT. The CoT is a named entity that defines an association between the DIW application and the issuing party application. The issuing party application is automatically permitted to access the DIW application associated with the CoT.

In some embodiments, automatically denying the access to the issuing party application using the DIW application includes denying the access to issuing party application to issue the at least one identity claim to the user of the DIW application.

In some embodiments, the method further includes the step of automatically permitting the issuing party application to access the DIW application if the DIW application is associated with the associated CoT. In some embodiments, automatically permitting the issuing party application to access the DIW application includes permitting the issuing party application to issue the at least one identity claim to the user of the DIW application.

In some embodiments, the issuing party application mapping is a mapping that specifies which CoT each issuing party application is associated with.

In some embodiments, the DIW application maps at least one CoT to at least one DIW application.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments.

There remains a need for a system and method for improving on existing approaches by providing benefits to relying parties (RPs) and issuing parties (IPs). Referring now to the drawings, and more particularly to FIGS. 1A through 15, where similar reference characters denote corresponding features consistently throughout the figures, there are shown preferred embodiments.

The system for access using a circle of trust improves the computer system by improving secure access for individuals and applications to credentials enabling authentication. This improves the computer system by improving security for the computer system.

FIG. 1A is a block diagram 100 that illustrates one or more relying party devices 114A-N associated with one or more relying parties 116A-N and one or more issuing party devices 120A-N associated with one or more issuing parties 122A-N communicating with one or more user devices 108A-N associated with one or more users 110A-N through a network 104 according to some embodiments herein. The block diagram 100 includes one or more digital identity wallet (DIW) application provider servers 102A-N, the network 104, a digital identity management (DIM) server 105, a circle of trust (CoT) administrator device 106 associated with a CoT administrator 107, the one or more user devices 108A-N associated with the one or more users 110A-N, the one or more relying party devices 114A-N associated with the one or more relying parties 116A-N and the one or more issuing party devices 120A-N associated with the one or more issuing parties 122A-N. In some embodiments, the network 104 is a wired network. In some embodiments, the network 104 is a wireless network. In some embodiments, the network is a combination of a wired network and a wireless network. In some embodiments, the network 104 is the Internet.

The one or more user devices 108A-N associated with the one or more users 110A-N include one or more digital identity wallet (DIW) applications 112A-N. In some embodiments, the one or more user devices 108A-N, without limitation, may be selected from a mobile phone, a Personal Digital Assistant (PDA), a tablet, a desktop computer, or a laptop. In some embodiments, each user device 112A-112N is associated with a user—for example, a user 110A, and may include more than one DIW application. For example, user device 108A associated with user 110A includes DIW application 112A and DIW application 112B. In some embodiments, each user device associated with the user 110A may obtain the one or more DIW applications 112A-N from the one or more DIW application provider servers 102A-N associated with one or more DIW application providers. In some embodiments, a DIW application (e.g., provided by a DIW application provider) enables a user to access services (e.g., provided by the DIW application provider) which require verified information from a user, where the verified information can be provided by the user using an identity claim (e.g., issued by an issuing party). In various embodiments, the one or more DIW application providers are companies such as health insurance companies, travel booking websites, online shopping websites, banks, or any other appropriate application provider. In some embodiments, each user device associated with the user 110A may obtain the one or more DIW applications 112A-N from the one or more issuing parties 122A-N. In some embodiments, a DIW application (e.g., provided by an issuing party) enables a user to provide information to a service provider, which require verified information from a user, where the verified information can be provided by the user using an identity claim (e.g., issued by an issuing party). In various embodiments, the one or more issuing parties 122A-N may be banks, credit rating agencies, or any other appropriate issuing parties.

In one example embodiment, the user 110A has separate health insurance policies from different healthcare companies. Each healthcare company may issue a DIW application to the user 110A—for example, a first health insurance company (e.g., FHI Co.) may issue the DIW application 112A (e.g., a FHI Co. wallet application) to the user 110A and a second health insurance company (e.g., a SHI Co.) may issue the DIW application 112B (e.g., a SHI Co. wallet application) to the user 110A.

The one or more relying party devices 114A-N associated with the one or more relying parties 116A-N include one or more relying party applications 118A-N. In some embodiments, the one or more relying parties 116A-N may be a hospital, a dental office, a pharmacy, etc. In some embodiments, the one or more relying party devices 114A-N, without limitation, may be selected from a mobile phone, a Personal Digital Assistant (PDA), a tablet, a desktop computer, or a laptop. Each relying party may include more than one relying party applications. For example, a relying party device 114A associated with a relying party 116A (e.g., a hospital) includes a relying party application 118A such as a relying party health insurance application and a relying party payment application.

The one or more issuing party devices 120A-N associated with the one or more issuing parties 122A-N may include one or more issuing party applications 124A-N. The one or more issuing parties 122A-N may be parties that are authorized to certify one or more attributes in an identity claim. In some embodiments, the one or more issuing parties 122A-N may be the banks, the credit rating agencies, etc. In some embodiments, the one or more issuing party devices 120A-N, without limitation, may be selected from a mobile phone, a Personal Digital Assistant (PDA), a tablet, a desktop computer, or a laptop. Each issuing party may include more than one issuing party applications. For example, an issuing party device 120A is associated with an issuing party 122A that has an issuing party application 124A. For example, a health insurance company issuing party health insurance application has an issuing party payment application. In some embodiments, a relaying party payment application and an issuing party payment application exchange payments—for example, the relying party payment application pays the issuing party payment application or the issuing party payment application pays the relying party payment application.

The CoT administrator device 106 associated with the CoT administrator 107 automatically defines a Circle of Trust (CoT) in a CoT database that is communicatively coupled to the DIM server 105. In some embodiments, the CoT administrator device 106, without limitation, may be selected from a mobile phone, a Personal Digital Assistant (PDA), a tablet, a desktop computer, or a laptop. The CoT comprises a named entity, wherein the CoT comprises a definition that includes an association between the one or more DIW applications 112A-N, the one or more relying party applications 118A-N and the one or more issuing party applications 124A-N. In some embodiments, the DIM server 105 is associated with one or more circles of trust (CoTs). In some embodiments, each CoT may associate with the one or more DIW applications 112A-N.

The DIM server 105 automatically receives DIW application requests from the one or more DIW application provider servers 102A-N associated with the one or more DIW application providers for the one or more DIW applications 112A-N to be associated with the CoT. In some embodiments, the CoT administrator 107 receives the DIW application requests via the DIM server 105 from the one or more DIW application provider servers 102A-N and selectively approves or rejects the DIW application requests. In some embodiments, the CoT administrator 107 of the CoT and an administrator of a corresponding DIW application provider may sign one or more business agreements. The DIM server 105 automatically adds an entry for the corresponding DIW application to the CoT database if the CoT administrator 107 approves a DIW application request of the corresponding DIW application. In some embodiments, the one or more DIW applications 112A-N are associated with the one or more CoTs (e.g., the healthcare CoT, a finance CoT, or a travel plan CoT). In some embodiments, a CoT record in a CoT database that includes a CoT identifier and a list of DIW applications (and/or relying party applications and/or issuing party application) that are associated with the CoT. In some embodiments, each DIW application associated with the CoT cannot access other DIW applications that are associated with the CoT.

The DIM server 105 automatically receives relying party application requests from the one or more relying party applications 118A-N associated with the one or more relying parties 116A-N for the one or more relying party applications 118A-N to be associated with the CoT. In some embodiments, the CoT administrator 107 receives the relying party application requests via the DIM server 105 from the one or more relying party applications 118A-N and selectively approves or rejects the relying party application requests. In some embodiments, the CoT administrator 107 and an administrator of a corresponding relying party may sign one or more business agreements. The DIM server 105 automatically adds an entry for the corresponding relying party application to the CoT database, if the CoT administrator 107 approves a corresponding relying party application request of the corresponding relying party application.

In some embodiments, the DIM server 105 restricts the one or more relying party applications 118A-N that are associated with the CoT from associating with other CoTs. In some embodiments, each relying party application associated with the relying party 116A may associate with different CoTs. For example, the relying party 116A includes the relying party application 118A and the relying party application 118B. The relying party application 118A may be associated with the healthcare CoT and the relying party application 118B may be associated with the finance CoT.

In some embodiments, each relying party application is associated with only one CoT. In some embodiments, each relying party application associated with the CoT cannot access other relying party applications and other issuing party applications that are associated with the CoT.

For example, a hospital may have a relying party health insurance application. If an administrator of the hospital wants to associate the relying party health insurance application with the healthcare CoT, the administrator of the hospital may send the relying party application request to the administrator of the healthcare CoT. The administrator of the healthcare CoT and the administrator of the hospital may sign one or more business agreements. If the relying party health insurance application of the hospital is associated with the healthcare CoT, the relying party health insurance application is restricted from associating with other CoTs (e.g., the finance CoT).

The DIM server 105 automatically permits the one or more relying party applications 118A-N to access the one or more DIW applications 112A-N that are associated with the CoT—for example, the DIM server 105 allows or enables an access request from the one or more relying party applications 118A-N to the one or more DIW applications 112A-N in the response to the one or more relying party applications 118A-N and the one or more DIW applications 112A-N being a part of a given CoT as indicated in a CoT record as stored in a CoT database. In some embodiments, the DIM server 105 permits the one or more relying party applications 118A-N to authenticate or authorize the each of the users 110A-N associated with the DIW applications 112A-N to the relying party applications 118A-N.

In some embodiments, the DIM server 105 automatically denies access to the one or more DIW applications 112A-N by a relying party application that is not associated with the CoT—for example, the DIM server 105 denies or does not enable an access request from the one or more relying party applications 118A-N to the one or more DIW applications 112A-N in the response to the one or more relying party applications 118A-N and the one or more DIW applications 112A-N not being a part of any given CoT as indicated in CoT records as stored in a CoT database. In some embodiments, the DIM server 105 automatically denies access to the one or more relying party applications 118A-N by a DIW application that is not associated with the CoT.

In some embodiments, an administrator of a second CoT may automatically define a second CoT at the DIM server 105. In some embodiments, the second CoT includes a second set of DIW applications. For example, in response to a relying party application 118A wanting/indicating to only access a subset of DIW applications in a first CoT, a second CoT is defined as the relying party application 118A and the subset of DIW applications—for example, if a first CoT includes the DIW application 112A, the DIW application 112B, a DIW application 112C, a DIW application 112D and the DIW application 112N, where the relying party application 118A wants/indicates to access only the DIW application 112A, the DIW application 112B and the DIW application 112C, an CoT administrator creates a second CoT that includes the DIW application 112A, the DIW application 112B and the DIW application 112C (as well as relying party application 118A).

In some embodiments, the DIM server 105 receives a second relying party application request from the relying party application 118A. In some embodiments, the DIM server 105 automatically adds/associates the second relying party application to the second CoT—for example, the second relying party application is indicated as part of the second CoT as indicated in a CoT record as stored in a CoT database.

In some embodiments, the DIM server 105 receives a second relying party application request from the relying party application 118A. In some embodiments, the DIM server 105 automatically denies the second relying party application to be part of the second CoT—for example, the second relying party application is not indicated as part of the second CoT (as indicated in a CoT record as stored in a CoT database) and is denied access to members of the second CoT.

The DIM server 105 automatically receives issuing party application requests from the one or more issuing party applications 124A-N associated with the one or more issuing parties 122A-N for the one or more issuing party applications 124A-N to be associated with the CoT. In some embodiments, the CoT administrator device 106 associated with the CoT administrator 107 receives the issuing party application requests from the one or more issuing party applications 124A-N via the DIM server 105 and conditionally approves or rejects the issuing party application requests. In some embodiments, the CoT administrator 107 and an administrator of a corresponding issuing party may sign one or more business agreements. The DIM server 105 automatically adds a corresponding issuing party application to the CoT database, if the CoT administrator 107 approves a corresponding issuing party application request of the corresponding issuing party application. In some embodiments, the DIM server 105 restricts the one or more issuing party applications 124A-N that are associated with the CoT from associating with other CoTs. In some embodiments, each issuing party application is associated with only one CoT. In some embodiments, each issuing party application associated with the CoT cannot access other issuing party applications and other relying party applications that are associated with the CoT.

The DIM server 105 automatically permits the one or more issuing party applications 124A-N to access the one or more DIW applications 112A-N that are associated with the CoT. In some embodiments, the DIM server 105 permits the one or more issuing party applications 124A-N to issue identity claims (e.g., a verified indication of identity or a credential) to the one or more users 110A-N associated with the one or more DIW applications 112A-N. In some embodiments, the one or more issuing party applications 124A-N issue the identity claims such as one or more of the following: (i) a first-name, (ii) a last-name, (iii) a date-of-birth, and (iv) a credit score of the one or more users 110A-N, or any other appropriate identity claim.

In some embodiments, the DIM server 105 automatically denies access to the one or more DIW applications 112A-N by an issuing party application that is not associated with the CoT—for example, a request for access is denied from an issuing party application in response to the issuing party application not being in a CoT that the one or more DIW applications 112A-N are also in. In some embodiments, the DIM server 105 automatically denies access to the one or more issuing party applications 124A-N by the DIW application that is not associated with the CoT—for example, a request for access is denied from an issuing party application in response to the issuing party application not being in a CoT that the one or more DIW applications 124A-N are also in.

Figure 1B:
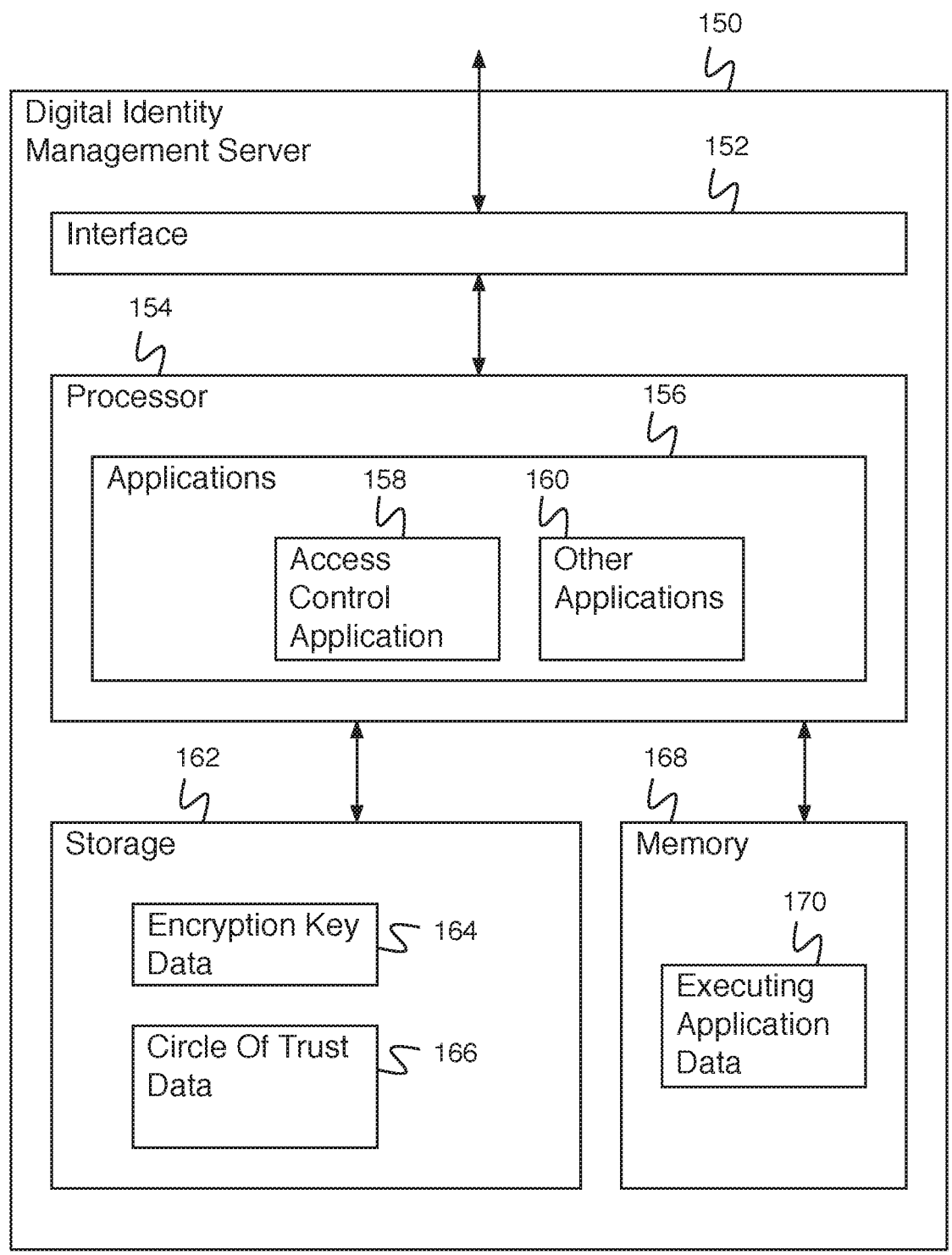
FIG. 1B is a block diagram illustrating an embodiment of a digital identity management server.

FIG. 1B is a block diagram illustrating an embodiment of a digital identity management server. In some embodiments, digital identity management server 150 comprises digital identity management server 105 of FIG. 1A. In the example shown, digital identity management server 150 comprises interface 152. For example, interface 152 comprises an interface for communicating with processor 154, a user device, a relying party device, an issuing part device, a digital identity wallet application provider server, a circle of trust administrator device, etc. For example, interface 152, comprises an interface for receiving user interactions, providing user interface data, communicating with other systems, receiving an access request from a first relying party application for permission to access a first digital identity wallet application, etc. Processor 154 comprises a processor for processing data. Processor 154 executes applications 156. Applications 156 comprise access control application 158 and other applications 160. For example, access control application 158 comprises an application for determining whether to grant access for the first relying party application to the first digital identity wallet application, wherein access is granted for the first relying party application to the first digital identity wallet application in response to the first relying party application belonging to a first circle of trust and the first digital identity wallet application belonging to the first circle of trust. In response to determining to grant access for the first relying party application to the first digital identity wallet application, providing an access granting indication, and in response to determining not to grant access for the first relying party application to the first digital identity wallet application, providing an access denial indication. For example, processor 154 provides an access granting indication that indicates to grant communication access between devices (e.g., a user device, a relying party device, an issuing part device, etc.) that is mediated by Digital Identity Management Server 150, or for example, processor 154 provides an access denial indication that indicates to deny communication access between devices (e.g., a user device, a relying party device, an issuing part device, etc.) that is mediated by Digital Identity Management Server 150.

Other applications 160 comprises any other appropriate applications, for example, a document processing application, a chat application, a social media application, a web browser application, etc. Storage 162 comprises encryption key data 164 (e.g., a private encryption key, a public encryption key, a recovery encryption key, a local encryption key, etc.) and circle of trust data 166 (e.g., information describing membership to a circle of trust, a relying party application mapping, a digital identity wallet mapping, etc.). Memory 168 comprises executing application data 170 comprising data associated with applications 156.

Figure 2A:
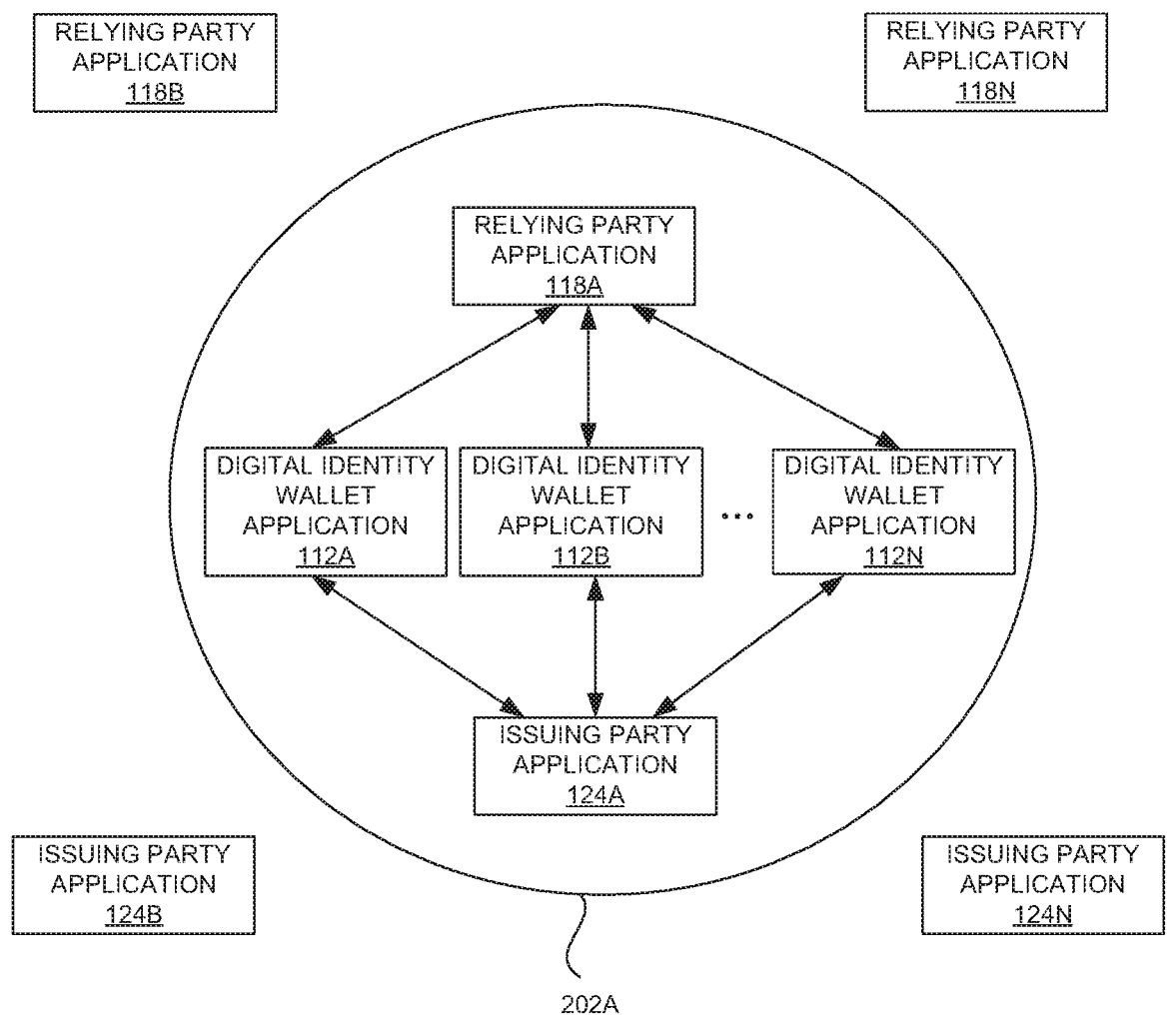
FIG. 2A is an exploded view of a first circle of trust according to some embodiments herein.

FIG. 2A is a conceptual representation 200 of a first CoT 202A according to some embodiments herein. The first CoT 202A includes the one or more DIW applications 112A-N, the relying party application 118A and the issuing party application 124A. In some embodiments, each DIW application associated with the first CoT 202A cannot access other DIW applications that are associated with the first CoT 202A. For example, the DIW application 112A cannot access other DIW applications such as the DIW application 112B and the DIW application 112N that are associated with the first CoT 202A.

A DIM server may be configured to permit the relying party application 118A to access the one or more DIW applications 112A-N that are associated with the same CoT (e.g., the first CoT 202A). In some embodiments, the DIM server (e.g., DIM server 105 in FIG. 1A) automatically permits the relying party application 118A to access the one or more DIW applications 112A-N includes permitting the relying party application 118A to authenticate or authorize each user associated with each DIW application to the relying party application 118A. The relying party application 118A accesses the one or more DIW applications 112A-N in the first CoT 202A at the relying party device 114A associated with the relying party 116A (shown in FIG. 1A) by specifying a wallet identifier of each DIW application and a user identifier of a user associated with each DIW application. In some embodiments, a relying party application 118A is permitted by a DIM server to access a DIW application that is associated with a given user, where the permission is enabled using the wallet identifier associated with the DIW application and the user identifier associated with the user by looking up whether the DIW application belongs to the CoT that the relying party application is a member of.

In some cases, the DIM server may be configured to deny access to the one or more DIW applications 112A-N by a relying party application. For example, the DIM server may be configured to deny a relying party application 118B or a relying party application 118N (as shown in FIG. 2A being outside the first CoT 202A) access to one or more DIW applications 112A-N when the relying party applications 118B and 118 N are not associated with the same CoT (e.g., the first CoT 202A) as the DIW applications 112A-N. In some embodiments, the relying party application 118A associated with the first CoT 202A cannot access the issuing party application 124A associated with the first CoT 202A.

The DIM server may further be configured to permit the issuing party application 124A to access the one or more DIW applications 112A-N that are associated with the first CoT 202A. In some embodiments, the DIM server automatically permits the issuing party application 124A to access the one or more DIW applications 112A-N includes permitting the issuing party application 124A to issue identity claims to each user associated with each DIW application. The issuing party application 124A accesses the one or more DIW applications 112A-N in the first CoT 202A at the issuing party device 120A associated with the issuing party 122A by specifying the wallet identifier of each DIW application and the user identifier of the user associated with each DIW application. The DIM server automatically denies access to the one or more DIW applications 112A-N by an issuing party application—for example, an issuing party application 124B or an issuing party application 124N (as shown in FIG. 2A being outside the first CoT 202A) that is not associated with the first CoT 202A. In some embodiments, the issuing party application 124A associated with the first CoT 202A cannot access the relying party application 118A associated with the first CoT 202A.

Figure 2B:
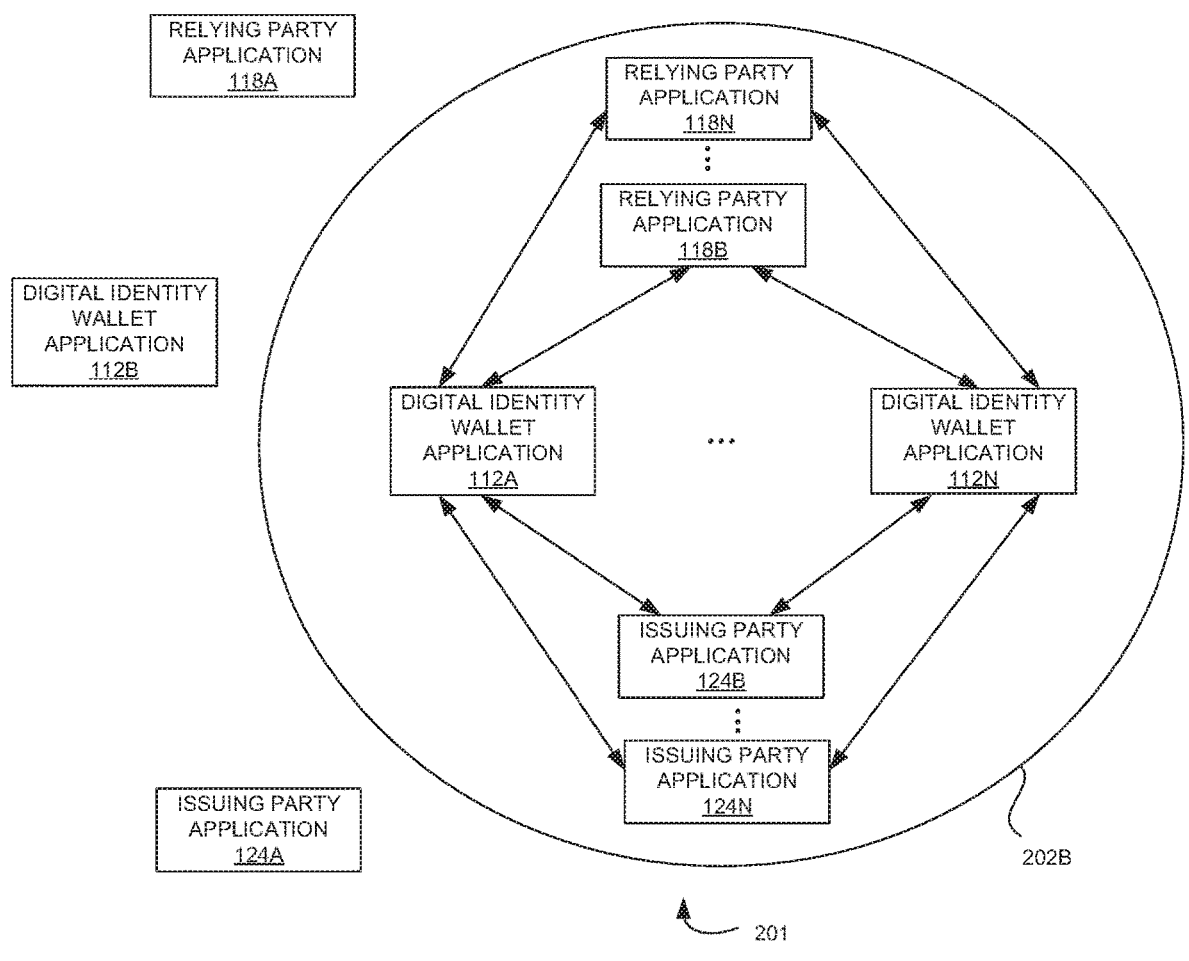
FIG. 2B is an exploded view of a second circle of trust according to some embodiments herein.

FIG. 2B is a conceptual representation 201 of a second CoT 202B according to some embodiments herein. The second CoT 202B includes the DIW application 112A and the DIW application 112N, the relying party application 118B, the relying party application 118N, the issuing party application 124B and the issuing party application 124N. The DIM server automatically permits the relying party application 118B and the relying party application 118N to access the DIW application 112A and the DIW application 112N that are associated with the second CoT 202B. In some embodiments, the DIM server (e.g., DIM server 105 of FIG. 1A) automatically permits the relying party application 118B and the relying party application 118N to access the DIW application 112A and the DIW application 112N includes permitting the relying party application 118B and the relying party application 118N to authenticate or authorize the user 110A associated with the DIW application 112A and a user 110N associated with the DIW application 112N at the relying party application 118B and the relying party application 118N.

In some embodiments, the relying party application 118B accesses the DIW application 112A in the second CoT 202B at the relying party device (e.g., relaying party device 114A FIG. 1A) associated with the relying party by specifying a wallet identifier of the DIW application 112A and a user identifier of the user associated with DIW application 112A. In some embodiments, the relying party application 118B accesses the DIW application 112N by specifying and a wallet identifier of the DIW application 112N and a user identifier of a user associated with DIW application 112N.

In some embodiments, the relying party application 118N accesses the DIW application 112A in the second CoT 202B at the relying party device associated with the relying party by specifying the wallet identifier of the DIW application 112A and the user identifier of the user associated with the DIW application 112A. In some embodiments, the relying party application 118N accesses the DIW application 112N by specifying the wallet identifier of the DIW application 112N and the user identifier of the user associated with the DIW application 112N.

The DIM server automatically denies access to the DIW application 112A and the DIW application 112N by a relying party application—for example, the relying party application 118A (as shown in FIG. 2B being outside the second CoT 202B) that is not associated with the second CoT 202B. In some embodiments, the DIM server automatically denies access to the relying party application 118B and the relying party application 118N associated with the second CoT 202B to access the DIW application 112B (as shown in FIG. 2B being outside the CoT 202B) that is not associated with the second CoT 202B.

In some embodiments, each relying party application associated with cannot access other relying party applications and other issuing party applications that are associated with the second CoT 202B. For example, the relying party application 118B cannot access the relying party application 118N, the issuing party application 124B and the issuing party application 124N associated with the second CoT 202B.

The DIM server automatically permits the issuing party application 124B and the issuing party application 124N to access the DIW application 112A and the DIW application 112N that are associated with the second CoT 202B.

In some embodiments, the DIM server automatically permits the issuing party application 124B and the issuing party application 124N to access the DIW application 112A and the DIW application 112N includes permitting the issuing party application 124B and the issuing party application 124N to issue identity claims to the user associated with the DIW application 112A and the user associated with the DIW application 112N.

In some embodiments, the issuing party application 124B accesses the DIW application 112A in the second CoT 202B at the issuing party device associated with the issuing party by specifying the wallet identifier of the DIW application 112A and the user identifier of the user associated with the DIW application 112A. In some embodiments, the issuing party application 124B accesses the DIW application 112N by specifying the wallet identifier of the DIW application 112N and the user identifier of the user associated with the DIW application 112N.

In some embodiments, the issuing party application 124N accesses the DIW application 112A in the second CoT 202B at the issuing party device associated with the issuing party by specifying the wallet identifier of the DIW application 112A and the user identifier of the user associated with the DIW application 112A. In some embodiments, the issuing party application 124N accesses the DIW application 112N by specifying the wallet identifier of the DIW application 112N and the user identifier of the user associated with the DIW application 112N.

The DIM server automatically denies access to the DIW application 112A and the DIW application 112N by an issuing party application—for example, the issuing party application 124A (as shown in FIG. 2B being outside the second CoT 202B) that is not associated with the second CoT 202B. In some embodiments, the DIM server automatically denies access to the issuing party application 124B and the issuing party application 124N to access a DIW application—for example, the DIW application 112B (as shown in FIG. 2B being outside the second CoT 202B) that is not associated with the second CoT 202B.

In some embodiments, each issuing party application associated with the second CoT 202B cannot access other issuing party applications and other relying party applications that are associated with the second CoT 202B. For example, the issuing party application 124B cannot access the relying party application 118B, the relying party application 118N and the issuing party application 124N associated with the second CoT 202B.

Figure 3:
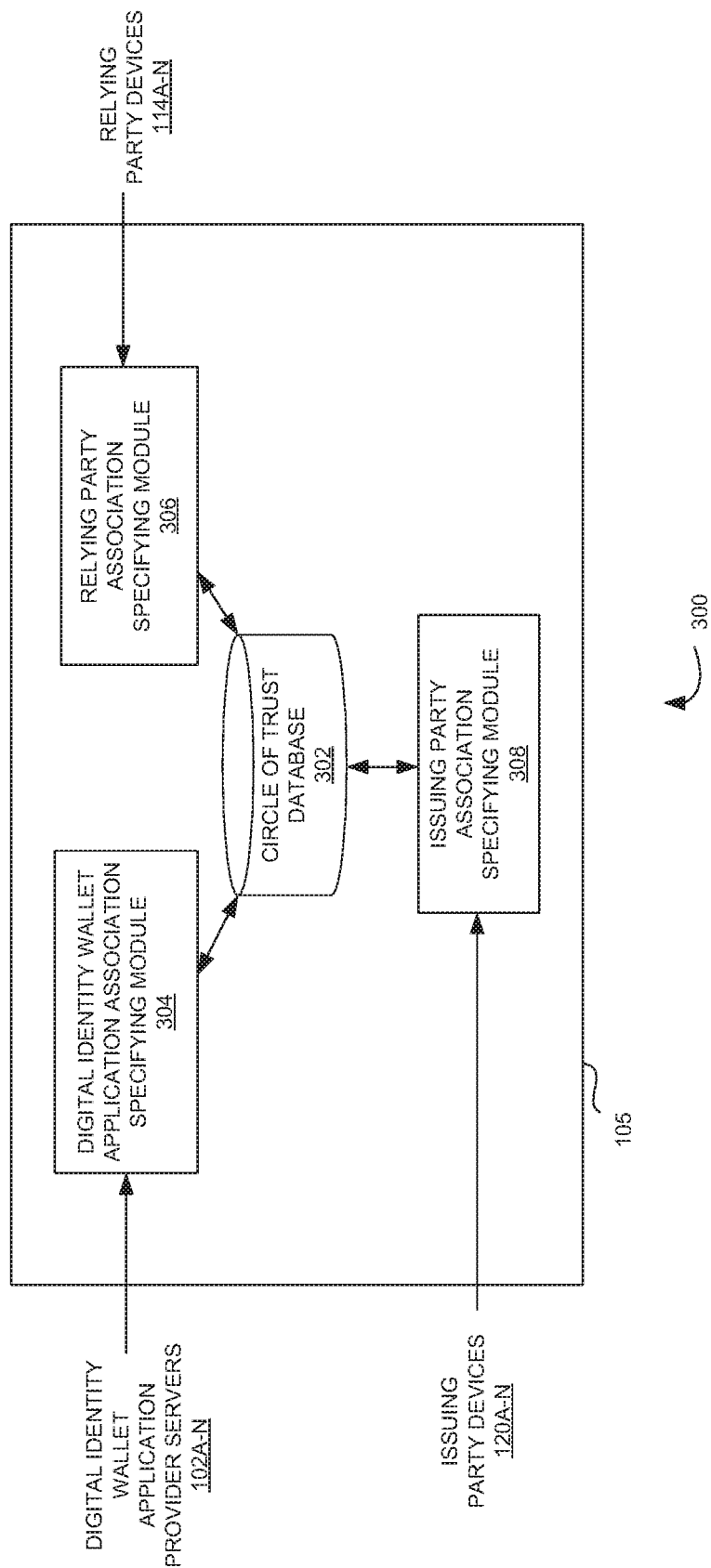
FIG. 3 is a block diagram of a digital identity management server of FIG. 1A according to some embodiments herein.

FIG. 3 is a block diagram 300 of the DIM server 105 of FIG. 1A according to some embodiments herein. The DIM server 105 includes a CoT database 302, a DIW application association specifying module 304, a relying party application association specifying module 306 and an issuing party application association specifying module 308. The DIW application association specifying module 304 specifies an association between the one or more DIW applications associated with each CoT at the CoT database 302. In some embodiments, the one or more DIW applications are associated with one or more CoTs—for example, a healthcare CoT, a finance CoT, a travel plan CoT, etc. In some embodiments, each DIW application associated with a CoT cannot access other DIW applications that are associated with the CoT.

The relying party application association specifying module 306 specifies an association between each relying party application and the one or more DIW applications associated with each CoT, at the CoT database 302. In some embodiments, each relying party application is associated with only one CoT. For example, if the relying party application associated with the relying party (e.g., relying party application 118A and replaying party 116A of FIG. 1A) is associated with the first CoT 202A—for example, a healthcare CoT, the relying party application is restricted from associating the second CoT (e.g., the finance CoT). In some embodiments, each relying party application associated with the CoT 202A, 202B cannot access other relying party applications and other issuing party applications that are associated with the CoT.

The issuing party application association specifying module 308 specifies an association between each issuing party application and the one or more DIW applications associated with each CoT 202A, 202B at the CoT database 302. In some embodiments, each issuing party application is associated with only one CoT 202A, 202B. In some embodiments, each issuing party application associated with the CoT cannot access other issuing party applications and other relying party applications that are associated with the CoT 202A, 202B.

Figure 4:
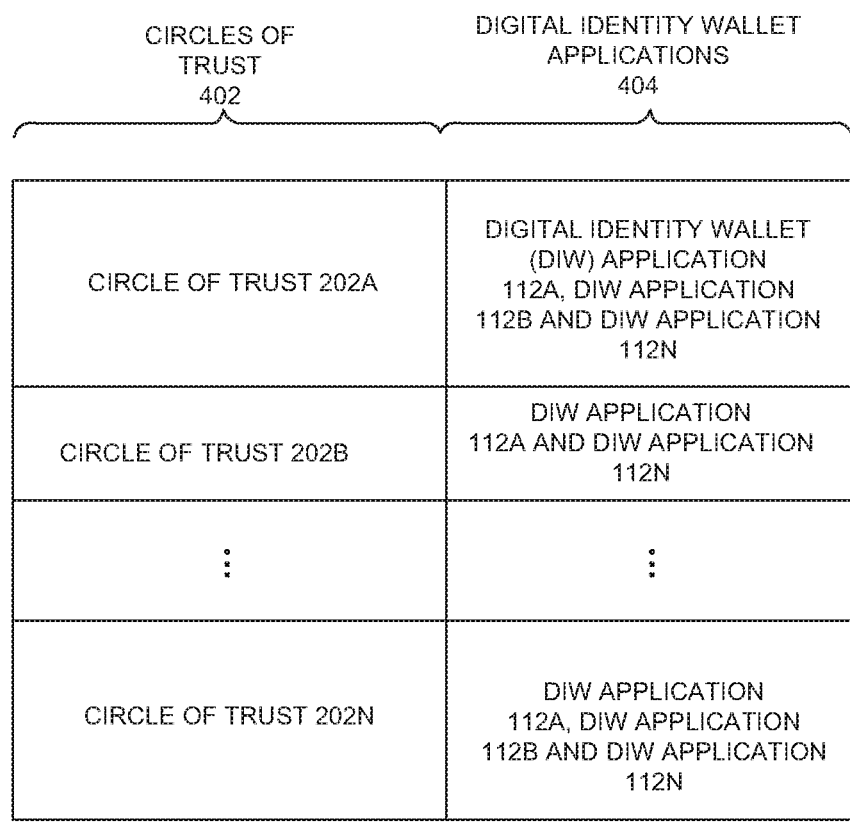
FIG. 4 is a representation of a digital identity wallet application table having a mapping that is stored in a circle of trust database that is communicatively coupled to the digital identity management server of FIG. 1A according to some embodiments herein.

FIG. 4 is a representation of a DIW application table 400 having a mapping that is stored in the CoT database 302 of FIG. 3 communicatively coupled to the DIM server 105 of FIG. 1A according to some embodiments herein. The DIW application table 400 having the mapping between circles of trust (CoTs) 402 and DIW applications 404. The mapping may be implemented as a table and/or any of a No-SQL database, a key-value store, a file system, or any of the above made available as a cloud-based storage infrastructure, according to some embodiments herein.

In some embodiments, the DIW application maps at least one CoT 402 to at least one DIW application 404. In some embodiments, each DIW application 404 associates with one or more CoTs 402. In some embodiments, each CoT 402 includes the one or more DIW applications 112A-N of FIG. 1A. For example, the CoT 202A of FIG. 2A includes the DIW application 112A, the DIW application 112B and the DIW application 112N. The CoT 202B of FIG. 2B includes the DIW application 112A and the DIW application 112N. A CoT 202N may include the DIW application 112A, the DIW application 112B and the DIW application 112N.

Figure 5:
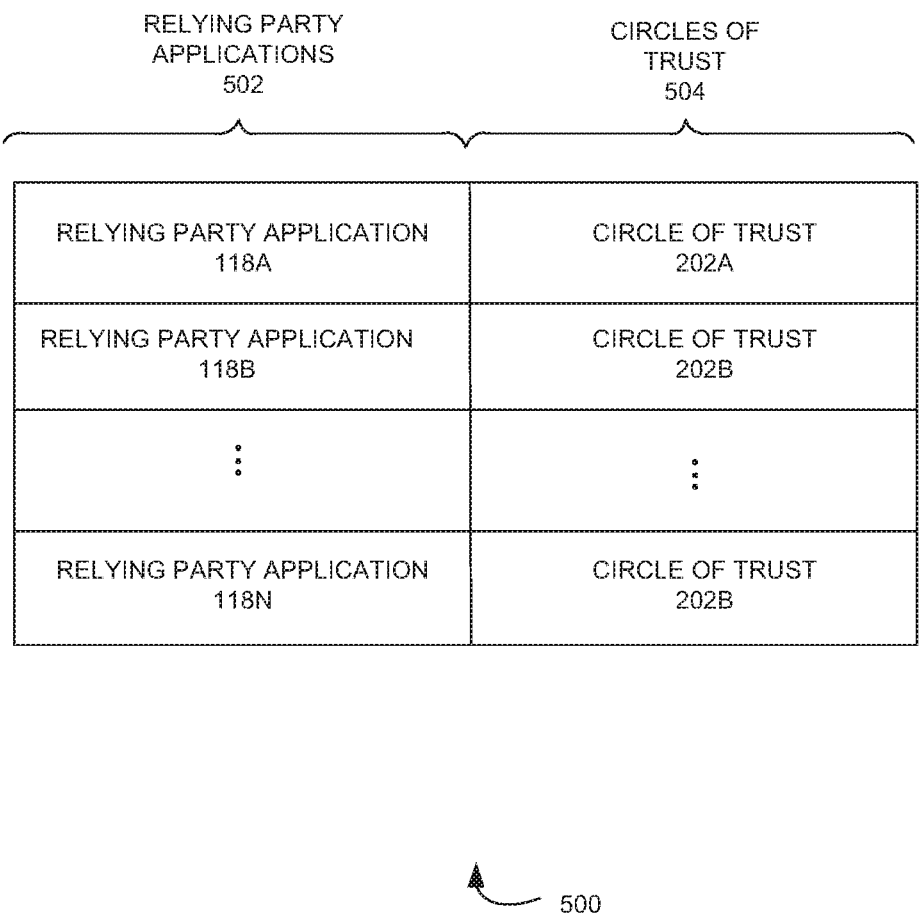
FIG. 5 is a representation of a relying party application table having a mapping that is stored in the circle of trust database of the digital identity management server of FIG. 1A according to some embodiments herein.

FIG. 5 is a representation of a relying party application table 500 having a mapping that is stored in the CoT database 302 of FIG. 3 of the DIM server 105 of FIG. 1A according to some embodiments herein. The relying party application table 500 having the mapping between relying party applications 502 and CoTs 504. The mapping specifies which CoT 504 each relying party application 502 is associated with. In some embodiments, each relying party application 502 is associated with only one CoT 504. For example, the relying party application 118A is associated with the CoT 202A. The relying party application 118B is associated with the CoT 202B. In some embodiments, each CoT includes one or more relying party applications. For example, the relying party application 118N is also associated with the CoT 202B.

Figure 6:
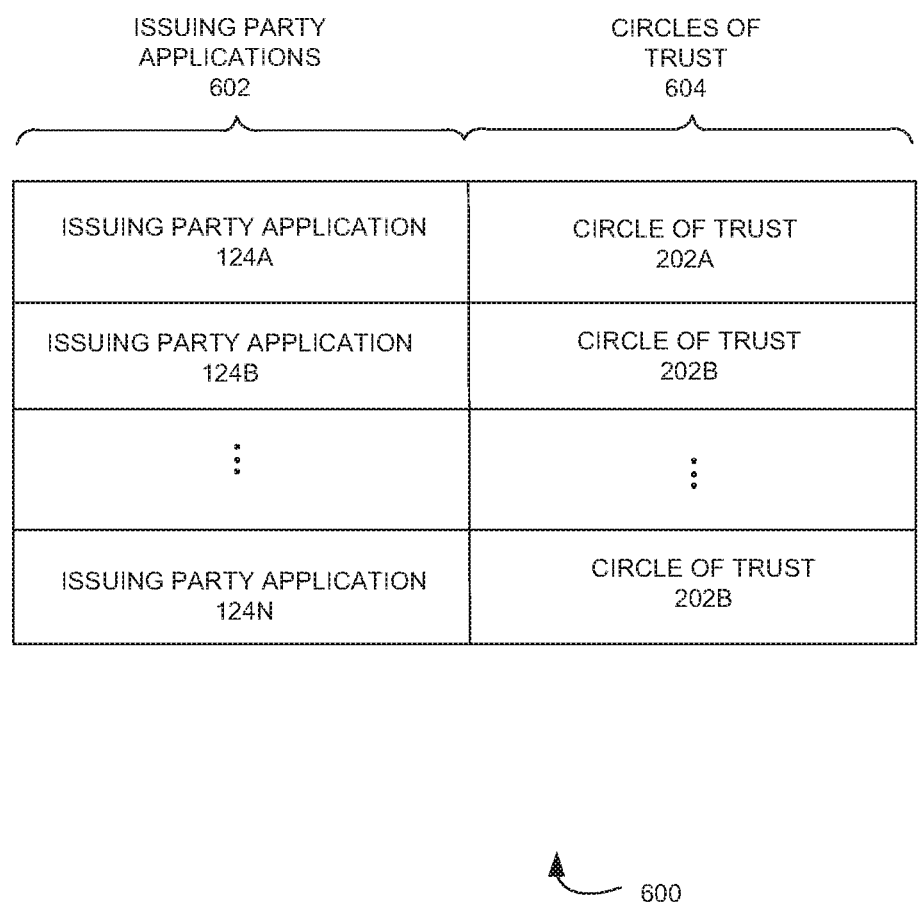
FIG. 6 is a representation of an issuing party application table having a mapping that is stored in the circle of trust database of the digital identity management server of FIG. 1A according to some embodiments herein.

FIG. 6 is a representation of an issuing party application table 600 having a mapping that is stored in the CoT database 302 of FIG. 3 of the DIM server 105 of FIG. 1A according to some embodiments herein. The issuing party application table 600 having the mapping between issuing party applications 602 and CoTs 604. The mapping specifies which CoT 604 each issuing party application 602 is associated with. In some embodiments, each issuing party application 602 is associated with only one CoT 604. For example, as shown in FIG. 2A, the issuing party application 124A is associated with the CoT 202A and as shown in FIG. 2B, the issuing party application 124B is associated with the CoT 202B. In some embodiments, each CoT 604 includes one or more issuing party applications 602. For example, as shown in FIG. 2B, the issuing party application 124N is also associated with the CoT 202B.

Figure 7:
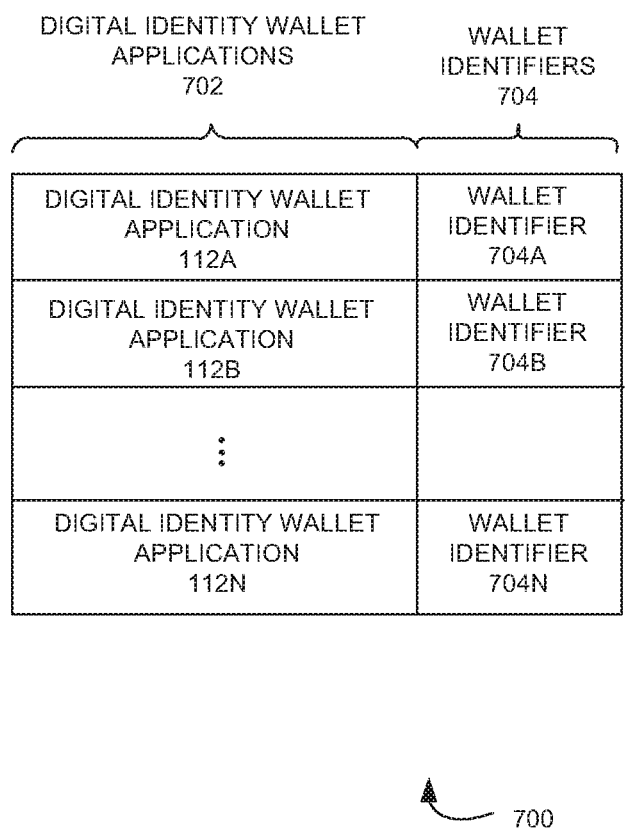
FIG. 7 is a representation of a circle of trust table having a mapping that is stored in the circle of trust database of the digital identity management server of FIG. 1A according to some embodiments herein.

FIG. 7 is a representation of a CoT table 700 having a mapping that is stored in the CoT database 302 of FIG. 3 of the DIM server 105 of FIG. 1A according to some embodiments herein. The CoT table 700 has the mapping between DIW applications 702 and wallet identifiers 704. Each DIW application 702 includes a wallet identifier 704. For example, the DIW application 112A includes a wallet identifier 704A. The DIW application 112B includes a wallet identifier 704B. The DIW application 112N includes a wallet identifier 704N.

Figure 8:
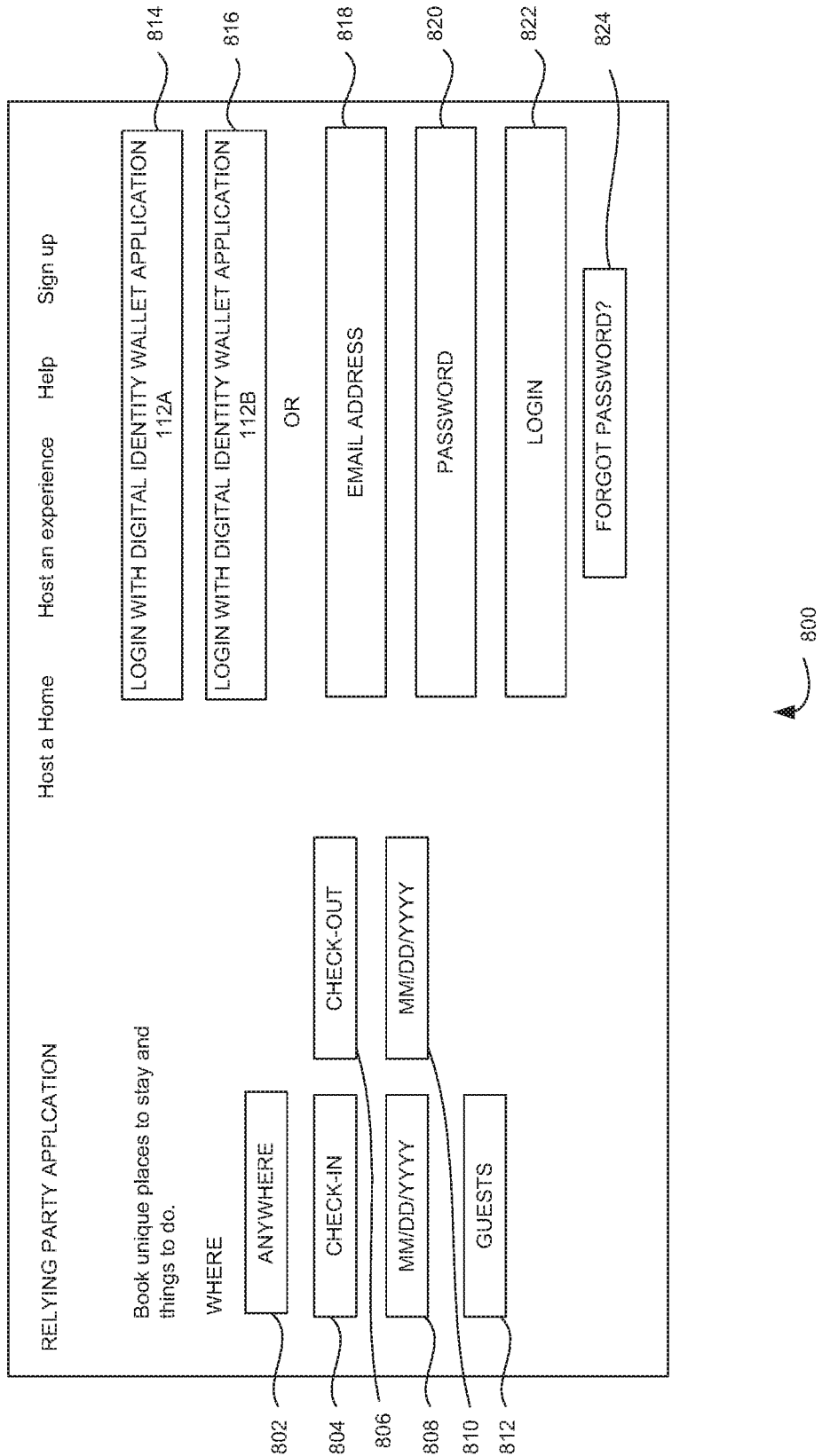
FIG. 8 is a mock-up screenshot of a user interface of a relying party application according to some embodiments herein.

FIG. 8 is a mock-up screenshot of a user interface 800 of a relying party application according to some embodiments herein. The user interface 800 includes a user logging on to the relying party application associated with a relying party as described herein. In some embodiments, the relying party application is Airbnb. In some embodiments, the user may click anywhere 802 to select a location or place to book hotel rooms. In some embodiments, the user may click check-in 804 to select check-in time and check-out 806 to select check-out time. In some embodiments, the user may click MM/DD/YYYY 808 to select check-in month (MM), date (DD) and Year (YY). In some embodiments, the user may click MM/DD/YYYY 810 to select check-out month (MM), date (DD) and Year (YY). In some embodiments, the user may click guests 812 to select a number of people to be stay in the hotel room(s).

The user may login to the relying party application using the DIW application 112A of FIG. 1A—for example, a Citibank wallet application, by clicking the login with the DIW application 112A 814. The user may login to the relying party application using in with the DIW application 112B—for example, a Bank of America wallet application by clicking the login with the DIW application 112B 816. The user may login to the relying party application using an email address 818 and a password 820 of the user for the relying party application by clicking login 822. In some embodiments, the user may click the "forgot password?" button 824 if the user forgets the email address 818 and the password 820 combination.

The relying party application may send an authentication or authorization request that is initiated by the user at the relying party application to the DIM server 105 of FIG. 1A. The DIM server 105 receives the authentication or authorization request from the relying party application. The DIM server 105 performs a relying party lookup operation on a relying party application mapping that is stored in the CoT database (e.g., CoT database 302 of FIG. 3) to identify an associated CoT that the relying party application is associated with.

If the user logs into the relying party application using the DIW application 112A, the DIM server 105 performs a DIW application lookup operation on a DIW application mapping that is stored in the CoT database to identify if the DIW application 112A is associated with the associated CoT. The DIM server 105 automatically permits the relying party application to access the DIW application 112A if the DIW application 112A is associated with the associated CoT. In some embodiments, the DIM server 105 enables a given relying party application to access a given DIW application by looking up whether the DIW application belongs to the CoT that the relying party application is a member of in response to the given relying party application and the given DIW application being in the same CoT.

If the user logs into the relying party application using the DIW application 112B, the DIM server 105 performs a DIW application lookup operation on a DIW application mapping that is stored in the CoT database to identify if the DIW application 112B is associated with the associated CoT. The DIM server 105 automatically permits the relying party application to access the DIW application 112B if the DIW application 112B—for example, the Bank of America wallet application, is associated with the associated CoT.

Figure 9:
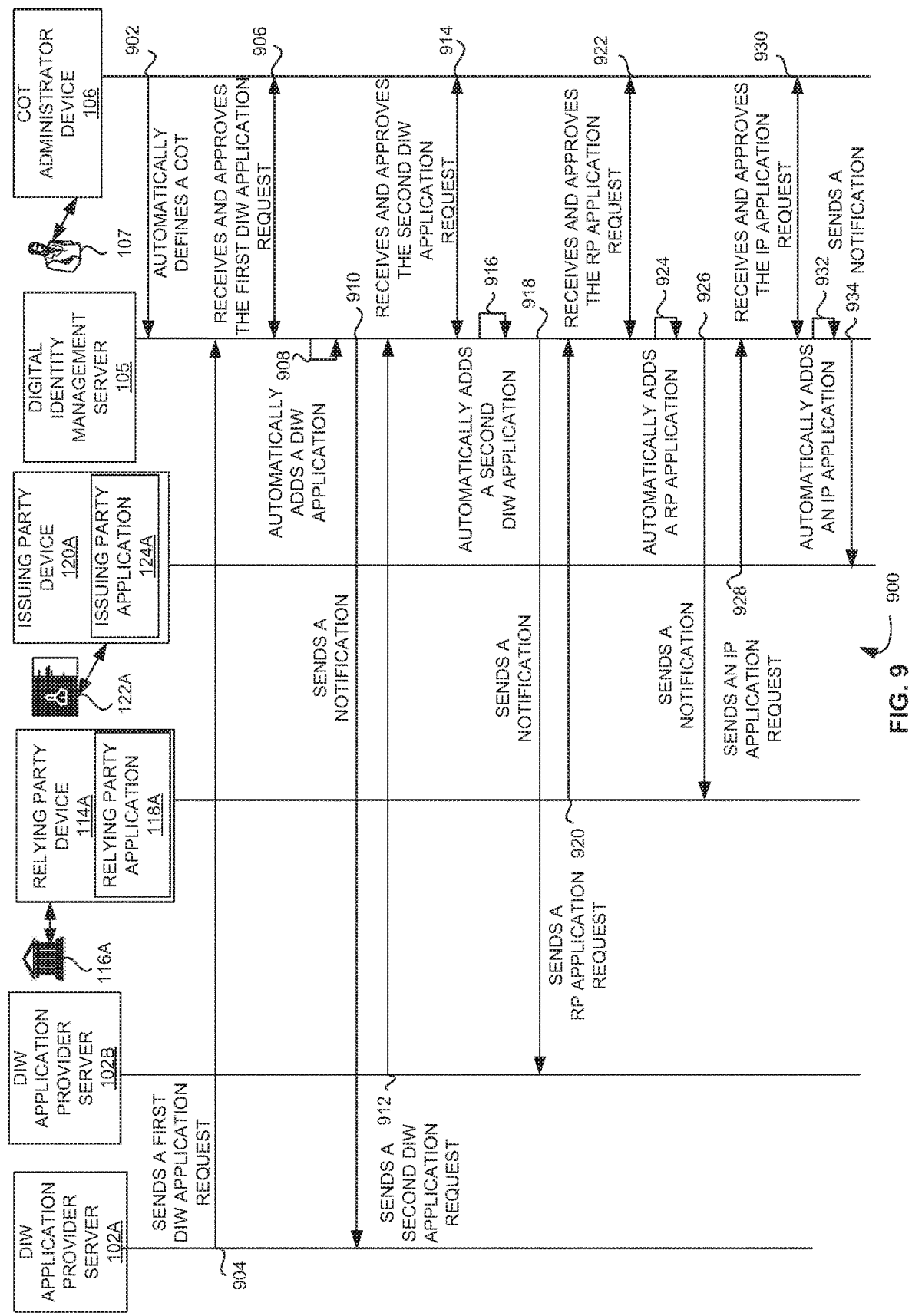
FIG. 9 is an interaction-type flow diagram that illustrates a method for automatically adding digital identity wallet applications, a relying party application associated with a relying party and an issuing party application associated an issuing party to a circle of trust database in a digital identity management server according to some embodiments herein.

FIG. 9 is an interaction-type flow diagram that illustrates a method 900 for automatically adding digital identity wallet applications, the relying party application 118A associated with the relying party 116A and the issuing party application 124A associated the issuing party 122A of FIG. 1A to the CoT database (e.g., CoT database 302 of FIG. 3) communicatively coupled to the DIM server 105 of FIG. 1A according to some embodiments herein. Note that as used herein, reference numbers may be used to identify corresponding elements in other figures. At step 902, the method 900 includes automatically defining a CoT—for example, a healthcare CoT by the CoT administrator 107 (e.g., a healthcare CoT administrator) in the CoT database. At step 904, the method 900 includes sending a first DIW application request for a first DIW application (e.g., an Aetna wallet application) by the DIW application provider server 102A associated with a first DIW application provider (e.g., Aetna health insurance company) if the first DIW application provider wants to associate the first DIW application with the CoT (e.g., the healthcare CoT).

At step 906, the method 900 includes automatically receiving the first DIW application request for the first DIW application from the DIM server 105 at the CoT administrator device 106 associated with the CoT administrator 107 and approving the first DIW application request for the first DIW application by the CoT administrator 107. In some embodiments, the CoT administrator 107 (e.g., the healthcare CoT administrator) and an administrator of the first DIW application provider may sign one or more business agreements.

At step 908, the method 900 includes automatically adding the first DIW application to the CoT database 302 if the CoT administrator 107 approves the first DIW application request. At step 910, the method 900 includes automatically sending a notification to the DIW application provider server 102A associated with the first DIW application provider by the DIM server 105. In some embodiments, at step 910, the DIM server 105 automatically sends an approval notification to the first DIW application provider server 102A associated with the first DIW application provider if the CoT administrator 107 (e.g., the healthcare CoT administrator) approves the first DIW application request. In some embodiments, at step 910, the DIM server 105 automatically sends a denial notification to the DIW application provider server 102A associated with the first DIW application provider if the CoT administrator 107 (e.g., the healthcare CoT administrator) denies the first DIW application request.

At step 912, the method 900 includes sending a second DIW application request for a second DIW application (e.g., a Cigna wallet application) by the DIW application provider server 102B associated with a second DIW application provider (e.g., Cigna health insurance company) if the second DIW application provider wants to associate the second DIW application with the CoT (e.g., the healthcare CoT). At step 914, the method 900 includes automatically receiving the second DIW application request for the second DIW application, from the DIM server 105 at the CoT administrator device 106 associated with the CoT administrator 107 and approving the second DIW application request for the second DIW application by the CoT administrator 107.

In some embodiments, the CoT administrator 107 (e.g., the healthcare CoT administrator) and an administrator of the second DIW application provider may sign one or more business agreements. At step 916, the method 900 includes automatically adding the second DIW application to the CoT database 302 if the CoT administrator 107 approves the second DIW application request. At step 918, the method 900 includes automatically sending a notification to the DIW application provider server 102B associated with the second DIW application provider by the DIM server 105.

In some embodiments, at step 918, the DIM server 105 automatically sends an approval notification to the DIW application provider server 102B associated with the second DIW application provider if the CoT administrator 107 (e.g., the healthcare CoT administrator) approves the second DIW application request. In some embodiments, at step 918, the DIM server 105 automatically sends a denial notification to the DIW application provider server 102B associated with the second DIW application provider if the CoT administrator 107 (e.g., the healthcare CoT administrator) denies the second DIW application request.

At step 920, the method 900 includes sending a relying party application request to the DIM server 105 by the relying party application 118A (e.g., a health insurance application) associated with the relying party 116A (e.g., a hospital) to be associated with the CoT (e.g., the healthcare CoT). At step 922, the method includes 900 includes automatically receiving the relying party application request, at the CoT administrator device 106 associated with the CoT administrator 107, from the DIM server 105 and approving the relying party application request by the CoT administrator 107 (e.g., the healthcare CoT administrator). In some embodiments, the CoT administrator 107 (e.g., the healthcare CoT administrator) and an administrator of the relying party 116A (e.g., the hospital) may sign one or more business agreements.

At step 924, the method 900 includes automatically adding the relying party application (e.g., the health insurance application) to the CoT database 302, if the CoT administrator 107 approves the relying party application request. The relying party application (e.g., the health insurance application) is automatically permitted to access the first DIW application (e.g., the Aetna wallet application) and the second DIW application (e.g., the Cigna wallet application) that are associated with the CoT (e.g., the healthcare CoT). In some embodiments, automatically permitting the relying party application (e.g., the health insurance application) to access the first DIW application and the second DIW application includes permitting the relying party application (e.g., the health insurance application) to authenticate or authorize a user associated with the first DIW application and at least one user associated with the second DIW application to the at least relying party application (e.g., the health insurance application).

At step 926, the method 900 includes automatically sending a notification to the relying party application 118A (e.g., the health insurance application) associated with the relying party 116A (e.g., the hospital) by the DIM server 105. In some embodiments, at step 926, the DIM server 105 automatically sends an approval notification to the relying party application 118A (e.g., the health insurance application) associated with the relying party 116A (e.g., the hospital) if the CoT administrator 107 (e.g., the healthcare CoT administrator) approves the relying party application request. In some embodiments, at step 926, the DIM server 105 automatically sends a denial notification to the relying party application 118A (e.g., the health insurance application) associated with the relying party 116A (e.g., the hospital) if the CoT administrator 107 (e.g., the healthcare CoT administrator) denies the relying party application request.

At step 928, the method 900 includes sending an issuing party application request to the DIM server 105 by the issuing party application 124A (e.g., a payment application) associated with the issuing party 122A (e.g., a bank for the issuing party application 124A—for example, the payment application) to be associated with the CoT (e.g., the healthcare CoT). At step 930, the method 900 includes automatically receiving the issuing party application request, at the CoT administrator device 106 associated with the CoT administrator 107, from the DIM server 105 and approving the issuing party application request by the CoT administrator 107 (e.g., the healthcare CoT administrator). In some embodiments, the CoT administrator 107 (e.g., the healthcare CoT administrator) and an administrator of the issuing party 122A (e.g., the bank) may sign one or more business agreements.

At step 932, the method 900 includes automatically adding, the issuing party application (e.g., the payment application) to the CoT database, if the CoT administrator 107 (e.g., the healthcare CoT administrator) approves the issuing party application request. The issuing party application (e.g., the payment application) is automatically permitted to access the first DIW application (e.g., the Aetna wallet application) and the second DIW application (e.g., the Cigna wallet application) that are associated with the CoT (e.g., the healthcare CoT). In some embodiments, automatically permitting the issuing party application (e.g., the payment application) to access the first DIW application and the second DIW application includes permitting the issuing party application (e.g., the payment application) to issue at least one identity claim to the user associated with the first DIW application and the at least one user associated with the second DIW application. In some embodiments, the at least one identity claim is at least one of (i) a first-name, (ii) a last-name, (iii) a date-of-birth and (iv) a credit score of the user associated with the first DIW application and the at least one user associated with the second DIW application.

At step 934, the method 900 includes automatically sending a notification to the issuing party application 124A (e.g., the payment application) associated with the issuing party 122A (e.g., the bank) by the DIM server 105. In some embodiments, the DIM server 105 automatically sends an approval notification to the issuing party application 124A (e.g., the payment application) associated with the issuing party 122A (e.g., the bank) if the CoT administrator 107 (e.g., the healthcare CoT administrator) approves the issuing party application request. In some embodiments, the DIM server 105 automatically sends a denial notification to the issuing party application 124A (e.g., the payment application) associated with the issuing party 122A (e.g., the bank) if the CoT administrator 107 (e.g., healthcare CoT administrator) denies the issuing party application request.

Figure 10:
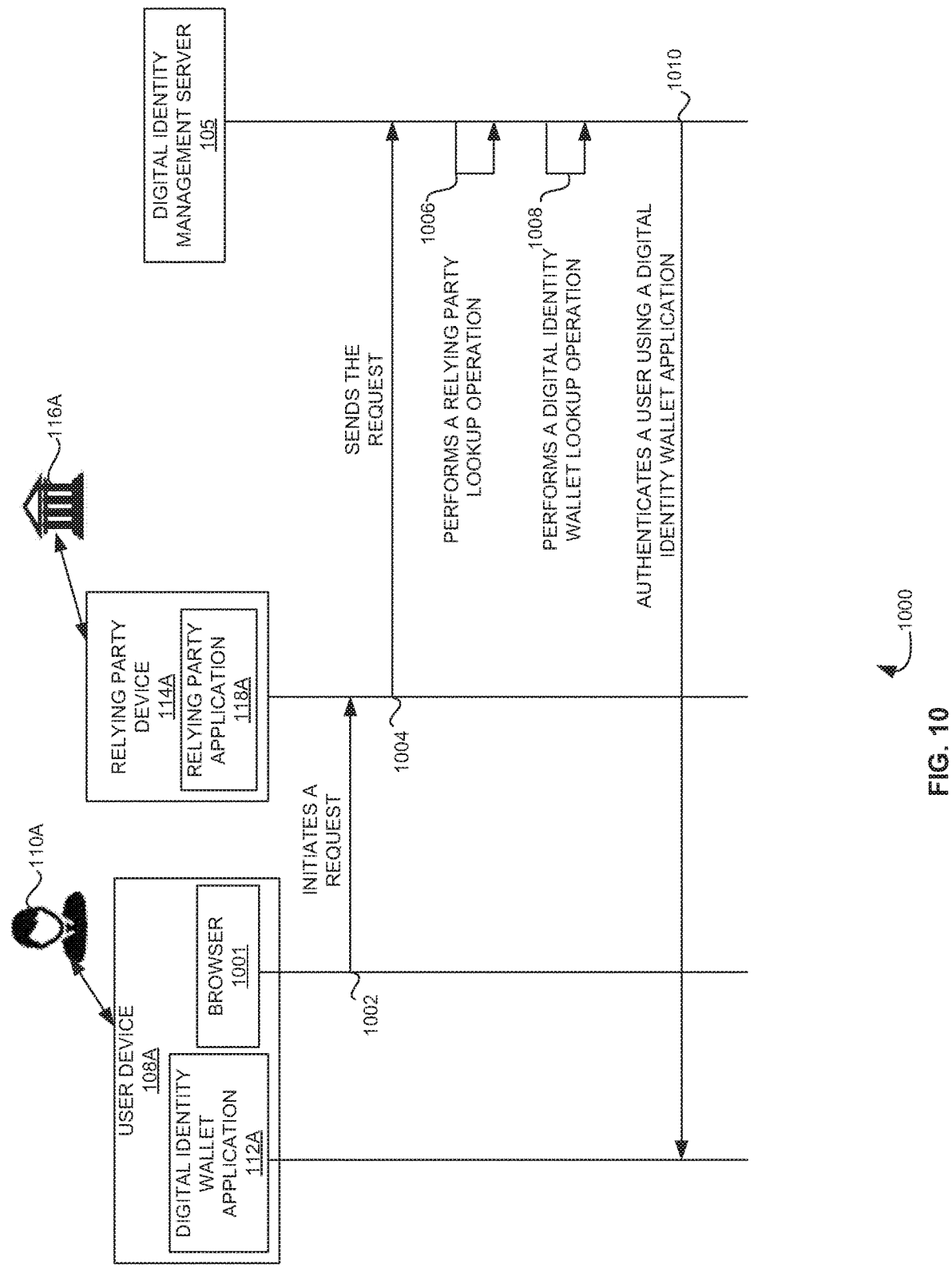
FIG. 10 is an interaction-type flow diagram that illustrates a method for automatically authenticating or authorizing a user of the relying party application to use a digital identity wallet application based on a circle of trust according to some embodiments herein.

FIG. 10 is an interaction-type flow diagram that illustrates a method 1000 for automatically authenticating or authorizing the user 110A of the relying party application 118A to use the DIW application 112A based on a CoT according to some embodiments herein. At step 1002, the method 1000 includes initiating an authentication or authorization request at the relying party application 118A (e.g., a travel or hospitality application) by the user 110A using a browser 1001 (e.g., a web browser) associated with the user device 108A. In various embodiments, the authentication or authorization request includes one or more of: a username, a password, cryptographic challenge, or any other appropriate authentication or authorization information. In some embodiments, the user 110A may login to the relying party application 118A (e.g., the travel or hospitality application) to book flight tickets, hotel rooms, etc.

At step 1004, the method 1000 includes sending the authentication or authorization request, which is initiated by the user 110A, from the relying party application 118A to the DIM server 105. In various embodiments, the authentication or authorization request includes one or more of: a username, a password, cryptographic challenge, or any other appropriate authentication or authorization information. At step 1006, the method 1000 includes performing, at the DIM server 105, a relying party lookup operation on a relying party application mapping that is stored in the CoT database that is communicatively coupled to the DIM server 105 to identify an associated CoT that the relying party application 118A is associated with. In some embodiments, a lookup operation is given a relying party application as input, and the lookup operation then returns the CoT that the relying party application belongs to as the output.

At step 1008, the method 1000 includes performing, at the DIM server 105, a DIW application lookup operation on a DIW application mapping that is stored in the CoT database to identify whether one or more DIW applications is associated with the associated CoT. For example, DIW application 112A (e.g., a banking or payment application) may be associated with the CoT. In some embodiments, the DIW application 112A is associated with one or more CoTs (e.g., a healthcare CoT, a finance CoT, a travel plan CoT, etc.).

At step 1010, the method 1000 includes authenticating the user 110A to the relying party application 118A using the DIW application 112A of the user 110A. In some embodiments, the DIM server 105 automatically denies access to the relying party application 118A to authenticate or authorize the user 110A using the DIW application 112A if the DIW application 112A is not associated with the associated CoT. In some embodiments, the relying party application 118A authenticates the user 110A based on an authentication challenge response to at least one authentication challenge. In some embodiments, the at least one authentication challenge is at least one of (i) a username and a password of the user 110A or (ii) at least one cryptographic challenge.

For example, the relying party application 118A is associated with the CoT (e.g., the travel plan CoT). The DIM server 105 automatically permits the relying party application 118A to authenticate or authorize the user 110A of the DIW application 112A to the relying party application 118A if the DIW application 112A is associated with the travel plan CoT. The DIM server 105 automatically denies the relying party application 118A to authenticate or authorize the user 110A of the DIW application 112A to the relying party application 118A if the DIW application 112A is not associated with the travel plan CoT.

In some embodiments, the system prevents a bad-acting relying party application from authenticating a user—for example, if the CoT that the relying party application belongs to does not contain the DIW, then the DIM server prevents the authentication request from being forwarded to that DIW application. In some embodiments, the system prevents a bad-acting issuing party application from providing false identity claims—for example, if the CoT that the issuing party application belongs to does not contain the DIW, then the DIM server prevents the issuance request from being forwarded to that DIW application.

Figure 11:
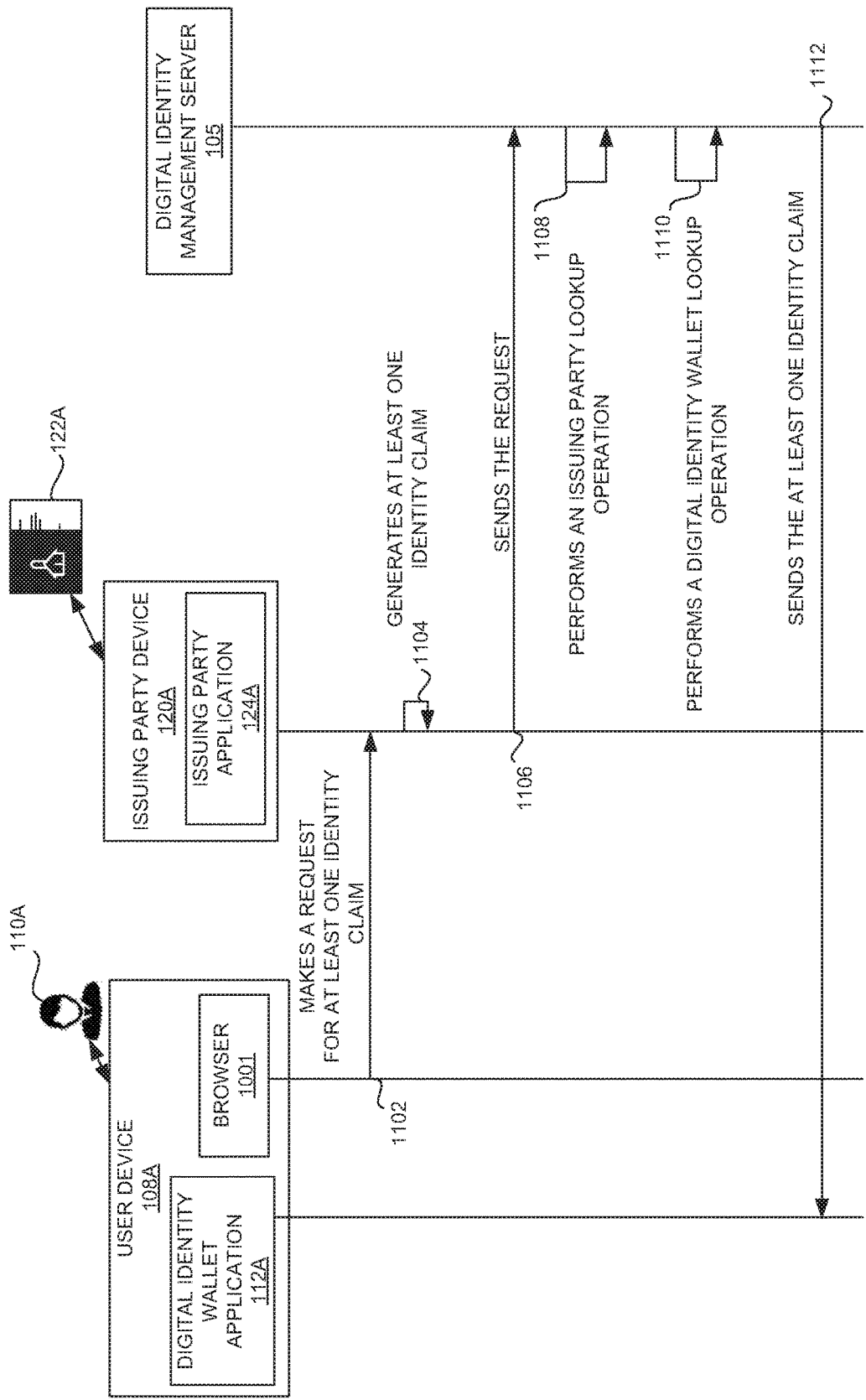
FIG. 11 is an interaction-type flow diagram that illustrates a method for automatically restricting the issuing party application associated with the issuing party to issue at least one identity claim to the digital identity wallet application associated with the user based on the circle of trust according to some embodiments herein.

FIG. 11 is an interaction-type flow diagram that illustrates a method 1100 for automatically restricting the issuing party application 124A associated with the issuing party 122A to issue at least one identity claim to the DIW application 112A associated with the user 110A based on a circle of trust according to some embodiments herein. At step 1102, the method 1100 includes making, at the issuing party application 124A using the browser 1001 associated with the user device 108A, a request for the at least one identity claim by the user 110A. In some embodiments, the user 110A may request the issuing party 122A for the at least one identity claim—for example, the identity claim comprises one or more of the following: (i) a first-name, (ii) a last-name, (iii) a date-of-birth, (iv) a credit score, or any other appropriate information of the user 110A. In some embodiments, the DIW application uses an identity claim issued by an issuing party to provide authenticated information of a user to a relying party. In some embodiments, the issuing party 122A may be a bank or a credit rating agency. In some embodiments, the bank may include one or more issuing party applications. Each issuing party application of the issuing party 122A (e.g., the bank) may associate with one or more CoTs. For example, the issuing party 122A (e.g., the bank) includes the issuing party application 124A relates to a credit score that is associated with a credit score CoT, the issuing party application 124A relates to a transaction that is associated with a finance CoT.

At step 1104, the method 1100 includes generating, at the issuing party application 124A, the at least one identity claim for the user 110A of the DIW application 112A. In some embodiments, the issuing party device 120A generates the at least one identity claim as a by-reference identity claim for attributes that vary with time such as a credit score, a cumulative grade point average (CGPA), a health parameter (e.g., blood sugar or cholesterol level).

At step 1106, the method 1100 includes sending, with the issuing party application 124A the request to the DIM server 105. In some embodiments, the issuing party application 124A sends the request that is initiated by the user 110A to the DIM server 105.

At step 1108, the method 1100 includes performing, at the DIM server 105, an issuing party lookup operation on an issuing party application mapping that is stored in the CoT database communicatively coupled to the DIM server 105 to identify an associated CoT that the issuing party application 124A is associated with. In some embodiments, the issuing party application mapping is a mapping that specifies which CoT each issuing party application is associated with. In some embodiments, the DIM server 105 is associated with the one or more CoTs. In some embodiments, each CoT is associated with one or more issuing party applications.

At step 1110, the method 1100 includes performing, at the DIM server 105, a DIW application lookup operation on a DIW application mapping that is stored in the CoT database to identify if the DIW application 112A is associated with the associated CoT. In some embodiments, the DIW application maps at least one CoT to at least one DIW application.

At step 1112, the method 1100 includes sending the at least one identity claim to the DIW application 112A of the user 110A by the DIM server 105. In some embodiments, the DIM server 105 automatically denies access to the issuing party application 124A to issue the at least one identity claim if the DIW application 112A is not associated with the associated CoT. For example, the issuing party application 124A may be associated with the credit score CoT. The DIM server 105 automatically permits the issuing party application 124A to issue the at least one identity claim to the user 110A if the DIW application 112A is associated with the credit score CoT. The DIM server 105 automatically denies access to the issuing party application 124A to issue the at least one identity claim to the user 110A if the DIW application 112A is not associated with the credit score CoT.

In some embodiments, the DIW application uses an identity claim issued by an issuing party to provide authenticated information of a user to a relying party. For example, the DIW uses an identity claim that indicates a verified credit score for a user as issued by a credit rating bureau that is transmitted to a bank in a loan application.

Figure 12:
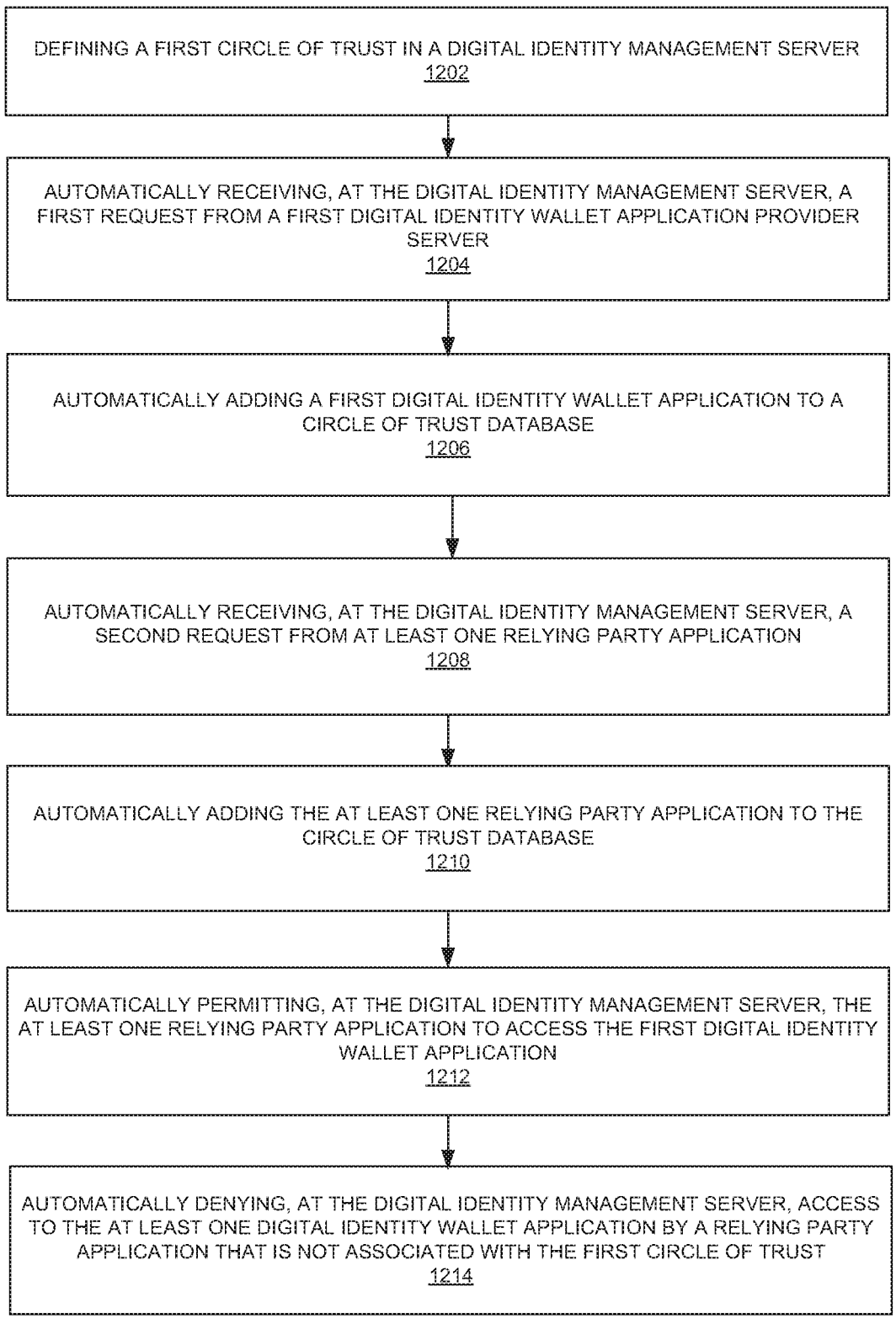
FIG. 12 is a flow diagram that illustrates a method for automatically adding at least one digital identity wallet application associated with a user and at least one relying party application to the circle of trust database in the digital identity management server according to some embodiments herein.

FIG. 12 is a flow diagram that illustrates a method 1200 for automatically adding at least one digital identity wallet application associated with a user and at least one relying party application to the CoT database in the DIM server according to some embodiments herein. At step 1202, the method 1200 includes automatically defining a first CoT by a first CoT administrator, in the CoT database. At step 1204, the method 1200 includes automatically receiving, at the DIM server, a first DIW application request from a first DIW application provider server associated with a first DIW application provider for a first DIW application to be associated with the first CoT. At step 1206, the method 1200 includes automatically adding the first DIW application to the CoT database if the first CoT administrator approves the first DIW application request. At step 1208, the method 1200 includes automatically receiving, at the DIM server, a relying party application request from the at least one relying party application associated with the relying party for the at least one relying party application to be associated with the first CoT. At step 1210, the method 1200 includes automatically adding, the at least one relying party application to the CoT database, if the first CoT administrator approves the relying party application request. The first CoT is a named entity that defines an association between the at least one DIW application and the at least one relying party application. The at least one relying party application is permitted to access the at least one DIW application. At step 1212, the method 1200 includes automatically permitting, at the DIM server, the at least one relying party application to access the first DIW application that is associated with the first CoT. In some embodiments, automatically permitting the at least one relying party application to access the first DIW application includes permitting the at least one relying party application to authenticate or authorize the user associated with the first DIW application to the at least relying party application. At step 1214, the method 1200 includes automatically denying, at the DIM server, access to the at least one DIW application by a relying party application that is not associated with the first CoT.

Figure 13:
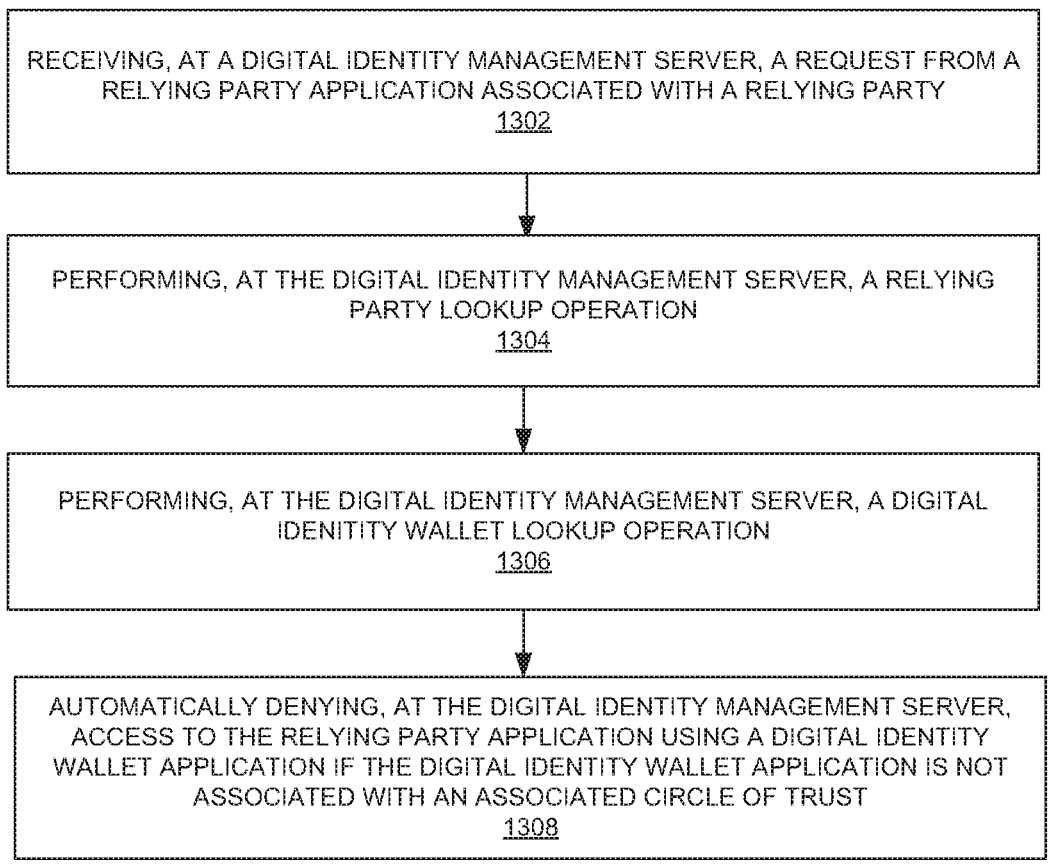
FIG. 13 is a flow diagram that illustrates a method for automatically restricting the relying party application to authenticate or authorize the user to the relying party application using the digital identity wallet application based on the circle of trust according to some embodiments herein.

FIG. 13 is a flow diagram that illustrates a method 1300 for automatically restricting a relying party application to authenticate or authorize a user to the relying party application using a DIW application based on a CoT according to some embodiments herein. At step 1302, the method 1300 includes receiving, at the DIM server, a request from the relying party application to authenticate or authorize the user to the relying party application using the DIW application. At step 1304, the method 1300 includes performing, at the DIM server, a relying party lookup operation on a relying party application mapping that is stored in the CoT database that is communicatively coupled to the DIM server to identify an associated CoT that the relying party application is associated with. The CoT is a named entity that defines an association between the DIW application and the relying party application. The relying party application is automatically permitted to access the DIW application associated with the CoT. At step 1306, the method 1300 includes performing, at the DIM server, a DIW application lookup operation on a DIW application mapping that is stored in the CoT database to identify if the DIW application is associated with the associated CoT. In some embodiments, the DIW application maps at least one CoT to at least one DIW application. At step 1308, the method 1300 includes automatically denying, at the DIM server 105, access to the relying party application using the DIW application if the DIW application is not associated with the associated CoT. In some embodiments, automatically denying the access to the relying party application using the DIW application includes denying access to the relying party application to authenticate or authorize the user of the DIW application to the relying party application using the DIW application.

Figure 14:
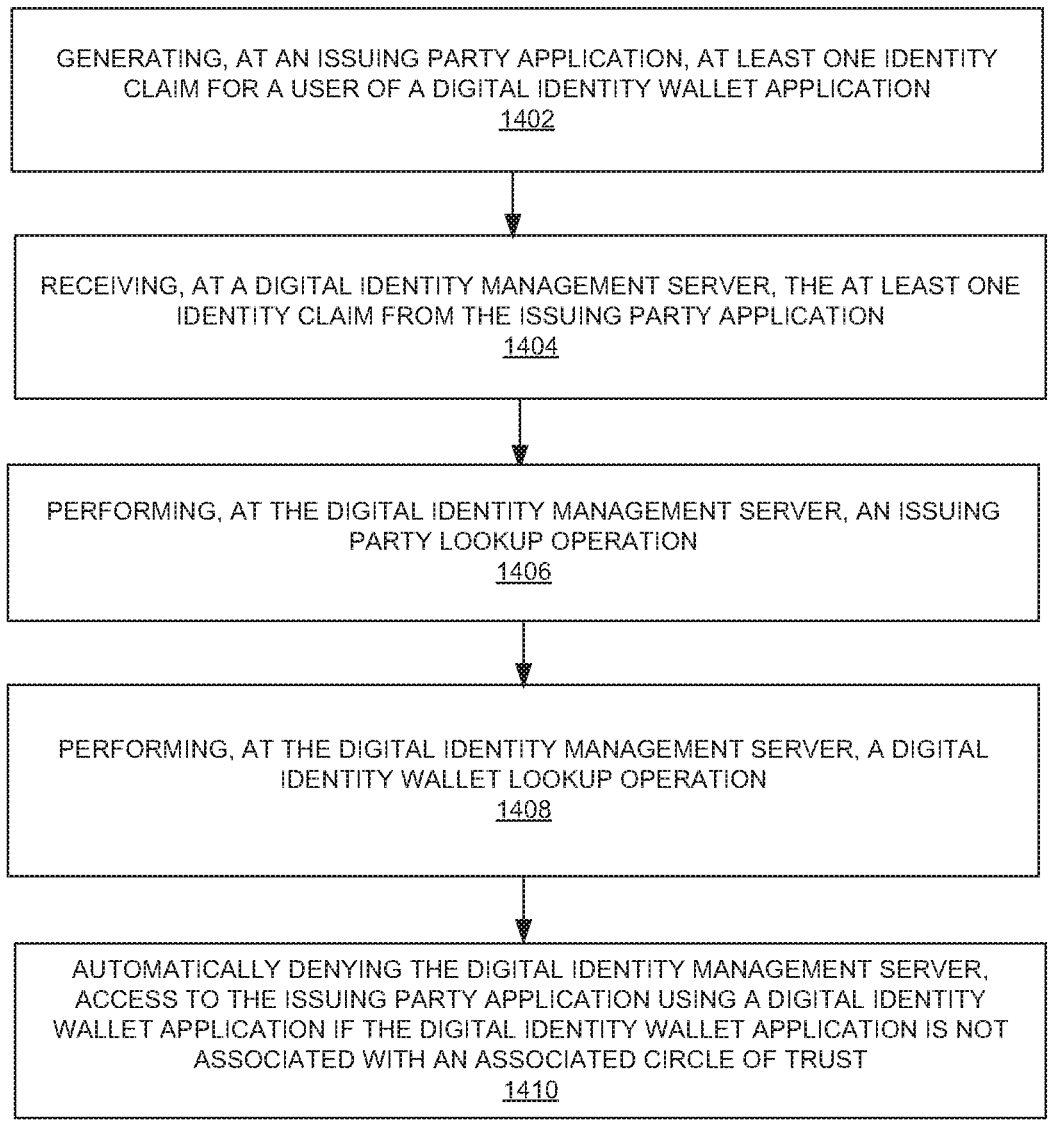
FIG. 14 is a flow diagram that illustrates a method for automatically restricting the issuing party application associated with the issuing party to issue the at least one identity claim to the digital identity wallet application associated with the user based on the circle of trust according to some embodiments herein.

FIG. 14 is a flow diagram that illustrates a method 1400 for automatically restricting an issuing party application associated with an issuing party to issue at least one identity claim to a DIW application associated with a user based on a CoT according to some embodiments herein. At step 1402, the method 1400 includes generating, at the issuing party application, the at least one identity claim t for the user of the DIW application. At step 1404, the method 1400 includes receiving, at the DIM server, the at least one identity claim from the issuing party application. At step 1406, the method 1400 includes performing, at the DIM server, an issuing party lookup operation on an issuing party application mapping that is stored in the CoT database that is communicatively coupled to the DIM server to identify an associated CoT that the issuing party application is associated with. The CoT is a named entity that defines an association between the DIW application and the issuing party application. The issuing party application is automatically permitted to access the DIW application associated with the CoT. At step 1408, the method 1400 includes performing, at the DIM server, a DIW application lookup operation on a DIW application mapping that is stored in the CoT database to identify if the DIW application is associated with the associated CoT. In some embodiments, the DIW application maps at least one CoT to at least one DIW application. At step 1410, the method 1400 includes automatically denying, at the DIM server, access to the issuing party application using the DIW application if the DIW application is not associated with the associated CoT. In some embodiments, automatically denying the access to the issuing party application using the DIW application includes denying the access to issuing party application to issue the at least one identity claim to the user of the DIW application.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 15:
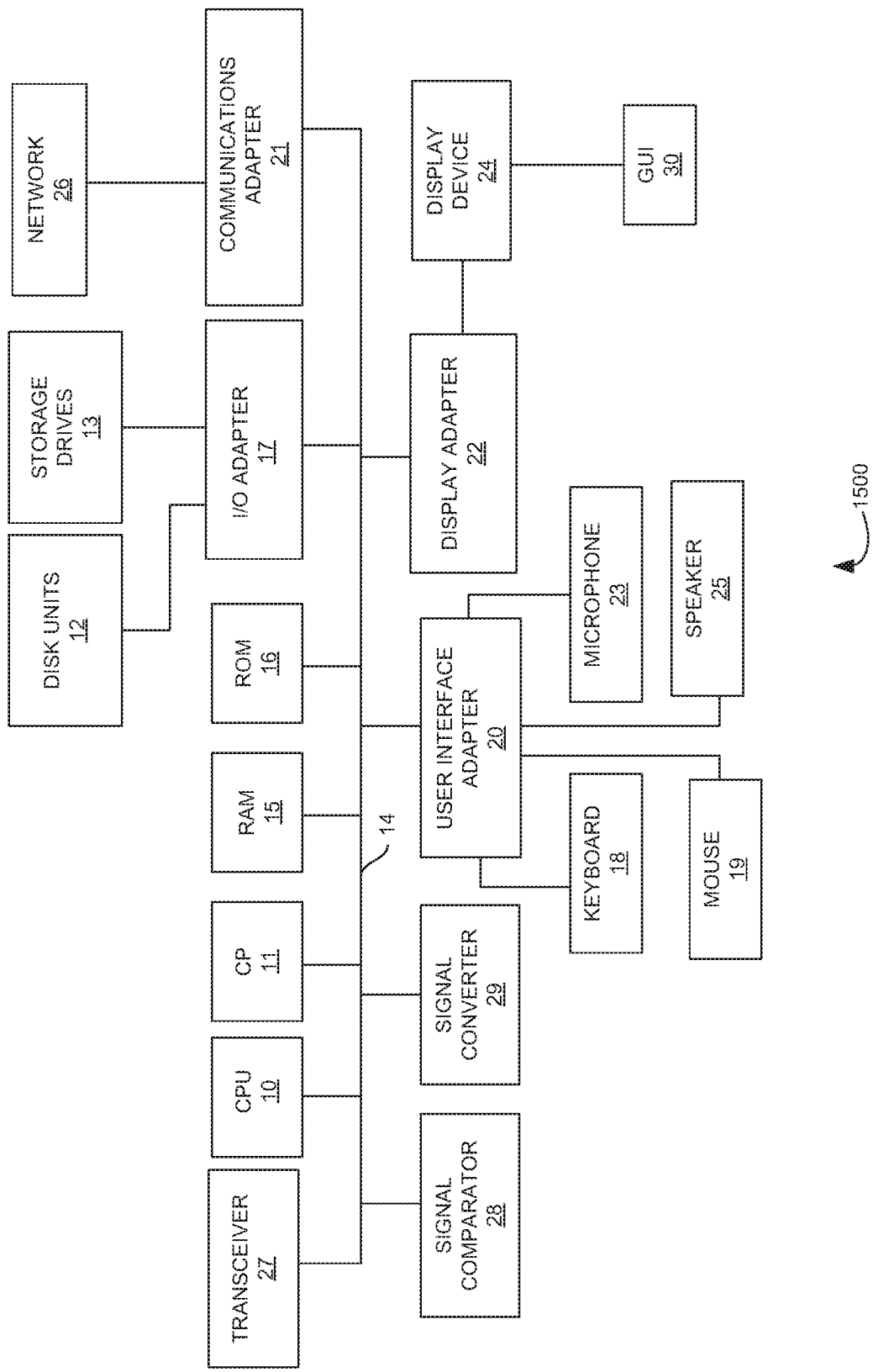
FIG. 15 is a block diagram of a schematic diagram of a device used in accordance with embodiments herein.

A representative hardware environment for practicing the embodiments herein is depicted in FIG. 15, with reference to FIGS. 1A through 14. This schematic drawing illustrates a hardware configuration of a server/computer system/user device in accordance with the embodiments herein. The user device includes at least one processing device CPU 10 and a cryptographic processor (CP) 11. The special-purpose CPU 10 and the cryptographic processor (CP) 11 may be interconnected via system bus 14 to various devices such as a random access memory (RAM) 15, read-only memory (ROM) 16, and an input/output (I/O) adapter 17. The I/O adapter 17 can connect to peripheral devices, such as disk units 12 and tape drives 13, or other program storage devices that are readable by the system. The user device can read the inventive instructions on the program storage devices and follow these instructions to execute the methodology of the embodiments herein. The user device further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A processor-implemented method for automatically adding at least one digital identity wallet (DIW) application and at least one relying party application associated with a relying party to a circle of trust (CoT) database, the method comprising:
   receiving, at a digital identity management server, a first DIW application request from a first DIW application provider server associated with a first DIW application provider for a first DIW application of the at least one DIW application to be associated with a first circle of trust (CoT);
   adding the first DIW application to the CoT database based on a first approval indicator of the first DIW application request from a first CoT administrator;
   receiving, at the digital identity management server, a relying party application request from the at least one relying party application associated with the relying party for the at least one relying party application to be associated with the first CoT; and
   adding the at least one relying party application to the CoT database based on a relying party approval indicator of the relying party application request from the first CoT administrator,
   wherein the first CoT is a named entity that defines an association between the at least one DIW application and the at least one relying party application, wherein the at least one relying party application is permitted to access the at least one DIW application.

2. The processor-implemented method of claim 1, further comprising
   permitting, at the digital identity management server, the at least one relying party application to access the first DIW application that is associated with the first CoT, wherein automatically permitting the at least one relying party application to access the first DIW application comprises permitting the at least one relying party application to authenticate or authorize a user associated with the first DIW application to the at least relying party application.

3. The processor-implemented method of claim 1, further comprising
   denying, at the digital identity management server, access to the at least one DIW application by a relying party application that is not associated with the first CoT.

4. The processor-implemented method of claim 1, further comprising
   sending an approval notification to the first DIW application provider server associated with the first DIW application provider if the first CoT administrator approves the first DIW application request from the first DIW application provider server associated with the first DIW application provider.

5. The processor-implemented method of claim 4, further comprising
   sending a denial notification to the first DIW application provider server associated with the first DIW application provider if the first CoT administrator denies the first DIW application request from the first DIW application provider server associated with the first DIW application provider.

6. The processor-implemented method of claim 1, further comprising
   accessing, the first DIW application in the first CoT, with the at least one relying party application in the first CoT at a relying party device associated with the relying party by specifying a first wallet identifier for the first DIW application and a user identifier of the user.

7. The processor-implemented method of claim 1, further comprising
   receiving, at the digital identity management server, a second DIW application request from a second DIW application provider server associated with a second DIW application provider of a second DIW application to be associated with the first CoT; and
   adding the second DIW application to the CoT database in response to the first CoT administrator approving the second DIW application request.

8. The processor-implemented method of claim 1, further comprising
   receiving, at the digital identity management server, an issuing party application request from at least one issuing party application associated with an issuing party for the at least one issuing party application to be associated with first CoT;
   adding the at least one issuing party application to the CoT database if the first CoT administrator approves the issuing party application request; and
   automatically permitting, at the digital identity management server, the at least one issuing party application to access the first DIW application and a second DIW application.

9. The processor-implemented method of claim 8, wherein automatically permitting the at least one issuing party application to access the first DIW application and the second DIW application comprises permitting the at least one issuing party application to issue at least one identity claim to a user of the first DIW application and at least one user of the second DIW application.

10. The processor-implemented method of claim 8, further comprising
    denying, at the digital identity management server, access to the at least one DIW application by an issuing party application that is not associated with the first CoT.

11. The processor-implemented method of claim 8, further comprising
    accessing, a user of the first DIW application in the first CoT, with the at least one issuing party application in the first CoT at an issuing party device associated with the issuing party by specifying a first wallet identifier for the first DIW application and a user identifier of the user.

12. The processor-implemented method of claim 8, further comprising
accessing, a user of the second DIW application in the first CoT, with the at least one issuing party application in the first CoT at an issuing party device associated with the issuing party by specifying a second wallet identifier for the second DIW application and a user identifier of the user.

13. The processor-implemented method of claim 1, wherein the first DIW application is associated with a plurality of circles of trust (CoTs), wherein the at least one relying party application is associated with only one CoT.

14. The processor-implemented method of claim 1, wherein each relying party application associated with the first CoT cannot access other relying party applications and other issuing party applications that are associated with the first CoT.

15. The processor-implemented method of claim 1, wherein each DIW application associated with the first CoT cannot access other DIW applications that are associated with the first CoT.

16. The processor-implemented method of claim 1, wherein each issuing party application associated with the first CoT cannot access other issuing party applications and other relying party applications that are associated with the first CoT.

17. The processor-implemented method of claim 1, further comprising
defining, at the digital identity management server, a second CoT by a second CoT administrator, wherein the second CoT comprises a second set of DIW applications;
receiving, at the digital identity management server, a second relying party application request from the at least one relying party application associated with the relying party to be associated with the second CoT;
adding the at least one relying party application to the second CoT in response to the second CoT administrator approving the second relying party application request from the at least one relying party application;
disassociating, at the digital identity management server, the at least one relying party application associated with the relying party from the first CoT;
permitting, at the digital identity management server, the at least one relying party application to access the second set of DIW applications associated with the second CoT; and
denying, at the digital identity management server, the at least one relying party application from accessing a first set of DIW applications that is associated with the first CoT.

18. A processor-implemented method for automatically permitting or denying authentication or authorization of a user to a relying party application associated with a relying party using a DIW application based on a CoT that is associated with the DIW application and the relying party application, the method comprising:
receiving, at a digital identity management server, a request from the relying party application to authenticate or authorize the user to the relying party application using the DIW application;
performing, at the digital identity management server, a relying party lookup operation on a relying party application mapping that is stored in a CoT database that is communicatively coupled to the digital identity management server to identify an associated CoT that the relying party application is associated with, wherein the CoT is a named entity that defines an association between the DIW application and the relying party application, wherein the relying party application is automatically permitted to access the DIW application associated with the CoT;
performing, at the digital identity management server, a DIW application lookup operation on a DIW application mapping that is stored in the CoT database to identify if the DIW application is associated with the associated CoT; and
denying, at the digital identity management server, access to the relying party application using the DIW application if the DIW application is not associated with the associated CoT.

19. The processor-implemented method of claim 18, wherein denying the access to the relying party application using the DIW application comprises denying access to the relying party application to authenticate or authorize the user of the DIW application to the relying party application using the DIW application.

20. The processor-implemented method of claim 18, further comprising permitting the relying party application to access the DIW application if the DIW application is associated with the associated CoT, wherein automatically permitting the relying party application to access the DIW application comprises permitting the relying party application to authenticate or authorize the user of the DIW application to the relying party application using the DIW application.

21. The processor-implemented method of claim 18, wherein the relying party application mapping is a mapping that specifies which CoT each relying party application is associated with.

22. The processor-implemented method of claim 18, wherein the DIW application maps at least one CoT to at least one DIW application.

23. The processor-implemented method of claim 18, wherein the DIW application is associated with a CoT if a CoT administrator approves a DIW application request from a DIW application provider to be associated with the CoT.

24. The processor-implemented method of claim 18, wherein the relying party application is associated to the CoT in response to the CoT administrator approving a relying party application request from a the relying party application associated with a relying party to be associated with the CoT.

25. The processor-implemented method of claim 18, wherein the DIW application is associated with a plurality of CoTs, wherein the relying party application is associated with only one CoT.

26. A processor-implemented method for controlling access of an issuing party application associated with an issuing party, the method comprising:
receiving, at a digital identity management server, at least one identity claim from the issuing party application;
performing, at the digital identity management server, an issuing party lookup operation on an issuing party application mapping that is stored in a CoT database that is communicatively coupled to the digital identity management server to identify an CoT that the issuing party application is associated with, wherein the CoT is a named entity that defines an association between a DIW application and the issuing party application, wherein the issuing party application is permitted to access the DIW application associated with the CoT;

performing, at the digital identity management server, a DIW application lookup operation on a DIW application mapping that is stored in the CoT database to identify if the DIW application is associated with the associated CoT; and denying, at the digital identity management server, access to the issuing party application using the DIW application in response to the DIW application being not associated with the CoT.

27. The processor-implemented method of claim 26, wherein denying the access to the issuing party application using the DIW application comprises denying the access to issuing party application to issue the at least one identity claim to a user of the DIW application.

28. The processor-implemented method of claim 26, further comprising
permitting the issuing party application to access the DIW application if the DIW application is associated with the associated CoT, wherein automatically permitting the issuing party application to access the DIW application comprises permitting the issuing party application to issue the at least one identity claim to a user of the DIW application.

29. The processor-implemented method of claim 26, wherein the issuing party application mapping is a mapping that specifies which CoT each issuing party application is associated with.

30. The processor-implemented method of claim 26, wherein the DIW application maps at least one CoT to at least one DIW application.

* * * * *

UNITED STATES PATENT AND TRADEMARK OFFICE
CERTIFICATE OF CORRECTION

| | | |
|---|---|---|
| PATENT NO. | : 11,483,316 B1 | Page 1 of 1 |
| APPLICATION NO. | : 16/918968 | |
| DATED | : October 25, 2022 | |
| INVENTOR(S) | : Krishnan Rajiyah et al. | |

It is certified that error appears in the above-identified patent and that said Letters Patent is hereby corrected as shown below:

In the Specification

In Column 12, Line(s) 20, before "CoT", delete "an" and insert -- a --, therefor.

In the Claims

In Column 30, Line(s) 48, Claim 24, delete "a the" and insert -- the --, therefor.

In Column 30, Line(s) 64, Claim 26, before "CoT", delete "an" and insert -- a --, therefor.

Signed and Sealed this
Eighth Day of August, 2023

*Katherine Kelly Vidal*

Katherine Kelly Vidal
*Director of the United States Patent and Trademark Office*